US009883041B2

(12) United States Patent
Kim et al.

(10) Patent No.: US 9,883,041 B2
(45) Date of Patent: Jan. 30, 2018

(54) APPARATUS AND METHOD FOR CALL FORWARDING IN COMMUNICATION SYSTEM

(71) Applicant: Samsung Electronics Co., Ltd., Gyeonggi-do (KR)

(72) Inventors: Jinyup Kim, Gyeonggi-do (KR); Junghwan Song, Gyeonggi-do (KR); Geon-Soo Kim, Gyeonggi-do (KR); Han-Jib Kim, Gyeonggi-do (KR); Sun Min Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/438,340

(22) Filed: Feb. 21, 2017

(65) Prior Publication Data
US 2017/0244837 A1 Aug. 24, 2017

(30) Foreign Application Priority Data
Feb. 19, 2016 (KR) .................. 10-2016-0020029

(51) Int. Cl.
*H04M 3/54* (2006.01)
*H04W 4/00* (2009.01)
*H04M 1/725* (2006.01)

(52) U.S. Cl.
CPC ....... *H04M 3/543* (2013.01); *H04M 1/72527* (2013.01); *H04W 4/001* (2013.01); *H04M 2207/18* (2013.01)

(58) Field of Classification Search
CPC ............. H04M 3/543; H04M 1/72527; H04M 2207/18; H04W 4/001
See application file for complete search history.

(56) References Cited

U.S. PATENT DOCUMENTS 9,716,795 B1* 7/2017 Kasilya Sudarsan ... H04M 3/54
2015/0004955 A1 1/2015 Li et al.
2015/0271340 A1* 9/2015 Yu .......................... H04M 3/543
455/417

(Continued)

FOREIGN PATENT DOCUMENTS

KR 20160002211 1/2016

OTHER PUBLICATIONS

Call forwarding, from Wikipedia the free encyclopedia, Jan. 24, 2017, pp. 1-5, https://en.wikipedia.org/wiki/Call_forwarding.

(Continued)

*Primary Examiner* — Brandon Miller
(74) *Attorney, Agent, or Firm* — The Farrell Law Firm, P.C.

(57) ABSTRACT

An electronic device is provided. The electronic device includes a memory, a communication module configured to communicate with an external electronic device, and a processor configured to: when a call forwarding is requested by the external electronic device, identify information on an embedded subscriber identity module (eSIM) profile of the external electronic device, based on call forwarding-related information stored in the memory; transmit the information on the eSIM profile to the external electronic device via the communication module; and set up the call forwarding with the external electronic device using the eSIM profile based on the information on the eSIM profile.

15 Claims, 14 Drawing Sheets

(56) References Cited

U.S. PATENT DOCUMENTS

| | | | |
|---|---|---|---|
| 2015/0350766 A1* | 12/2015 | Schobel | H04R 1/1091 |
| | | | 381/77 |
| 2015/0382178 A1 | 12/2015 | Park et al. | |
| 2016/0057285 A1* | 2/2016 | Lee | H04M 3/42153 |
| | | | 455/417 |
| 2016/0127559 A1* | 5/2016 | Baek | G06F 21/35 |
| | | | 455/417 |
| 2017/0235731 A1* | 8/2017 | Kurapati | G06F 17/3051 |
| | | | 707/770 |

OTHER PUBLICATIONS

3GPP TS 23.082 V9.0.0 (Dec. 2009), 3rd Generation Partnership Project; Technical Specification Group Core Network and Terminals; Call Forwarding (CF) supplementary services; Stage 2 (Release 9).

3GPP TS 22.030 V13.0.0 (Jan. 2016), 3rd Generation Partnership Project; Technical Specification Group Services and System Aspects; Man-Machine Inerface (MMI) of the User Equipment (UE) (Release 13), http://www.3gpp.org, pp. 1-28.

3GPP TS 22.082 V7.0.0 (Jun. 2007) 3rd Generation Partnership Project; Technical Specification Group Services and System Aspects; Call Forwarding (CF) supplementary services—Stage 1 (Release 7), http://www.3gpp.org, pp. 1-34.

3GPP TS 24.082 V4.0.1 (Jun. 2002) 3rd Generation Partnership Project; Technical Specification Group Core Network; Call Forwarding (CF) supplementary services—Stage 3 (Release 4), http://www.3gpp.org, pp. 1-36.

3GPP TS 23.082 V9.0.0, 3rd Generation Partnership Project; Technical Specification Group Core Network and Terminals; Call Forwarding (CF) supplementary services; Stage 2 (Release 9), Dec. 2009, Complete Article.

* cited by examiner

APPARATUS AND METHOD FOR CALL FORWARDING IN COMMUNICATION SYSTEM

PRIORITY

The present application claims priority under 35 U.S.C. §119(a) to Korean Patent Application Serial No. 10-2016-0020029, which was filed in the Korean Intellectual Property Office on Feb. 19, 2016, the content of which is incorporated herein by reference.

BACKGROUND

1. Field of the Disclosure

The present disclosure relates generally to an apparatus and a method, and more particularly, to an apparatus and method for call forwarding in a mobile network operator (MNO) subscription authentication module-based communication system.

2. Description of the Related Art

Call forwarding is a service which automatically redirects a telephone call received at a telephone having a first telephone number to a telephone having a second telephone number designated by a user. Call forwarding has also been expanded to a call forwarding function between an electronic device (a mobile communication device) and an external electronic device (a wearable device).

An external electronic device or an electronic device can include an embedded subscriber identity module (eSIM), which can be mounted in the electronic device without having subscription information recorded thereon, and can be sold to a user. Thereafter, the user may download and install an eSIM profile including subscription information in the eSIM in an over the air (OTA) method by accessing a MNO network that the user wishes to use.

As wearable devices have been developed to be independent devices rather than dependent devices, a communication function of a wearable device has been highlighted as an important aspect. A wearable device, for example, may store one eSIM profile in one eSIM in order to provide the communication function.

However, a wearable device is sold having a fixed SIM profile that is provided therein during a manufacturing process, and it is impossible to register a desired SIM card after a user purchases the wearable device. Therefore, it is impossible to transfer an eSIM card between a wearable device and an electronic device or to change a telecommunication operator of the wearable device.

Therefore, there is a demand for a method for transferring an eSIM card or changing a telecommunication operator of a wearable device.

SUMMARY

In accordance with an aspect of the present disclosure, there is provided an electronic device. The electronic device includes a memory, a communication module configured to communicate with an external electronic device, and a processor configured to: when a call forwarding is requested by the external electronic device, identify information on an embedded subscriber identity module (eSIM) profile, which is enabled in the external electronic device, based on call forwarding-related information stored in the memory; transmit the information on the eSIM profile to the external electronic device via the communication module; and set up the call forwarding with the external electronic device using the eSIM profile based on the information on the eSIM profile.

In accordance with an aspect of the present disclosure, there is provided an external electronic device. The external electronic device includes a communication module configured to communicate with an electronic device and a processor configured to: when a call forwarding is requested, transmit a call forwarding request message to the electronic device via the communication module; in response to the call forwarding request message, receive information on an embedded subscriber identity module (eSIM) profile, which is enabled in the external electronic device, from the electronic device; and set up the call forwarding with the electronic device based on the information on the eSIM profile.

In accordance with an aspect of the present disclosure, there is provided a method for setting up a call forwarding with an external electronic device in an electronic device. The method includes receiving a request for the call forwarding from the external electronic device, in response to the received request, identifying information related to at least one embedded subscriber identity module (eSIM) profile which is enabled in the external electronic device based on call forwarding-related information which is stored in the electronic device, transmitting the information to the external electronic device, and setting up the call forwarding using the information.

In accordance with an aspect of the present disclosure, there is provided a method for setting up a call forwarding with an electronic device in an external electronic device. The method includes when a call forwarding is requested, transmitting a call forwarding request message to the electronic device, in response to the call forwarding request message, receiving information related to at least one embedded subscriber identity module (eSIM profile), which is enabled in the external electronic device, and setting up the call forwarding using the information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
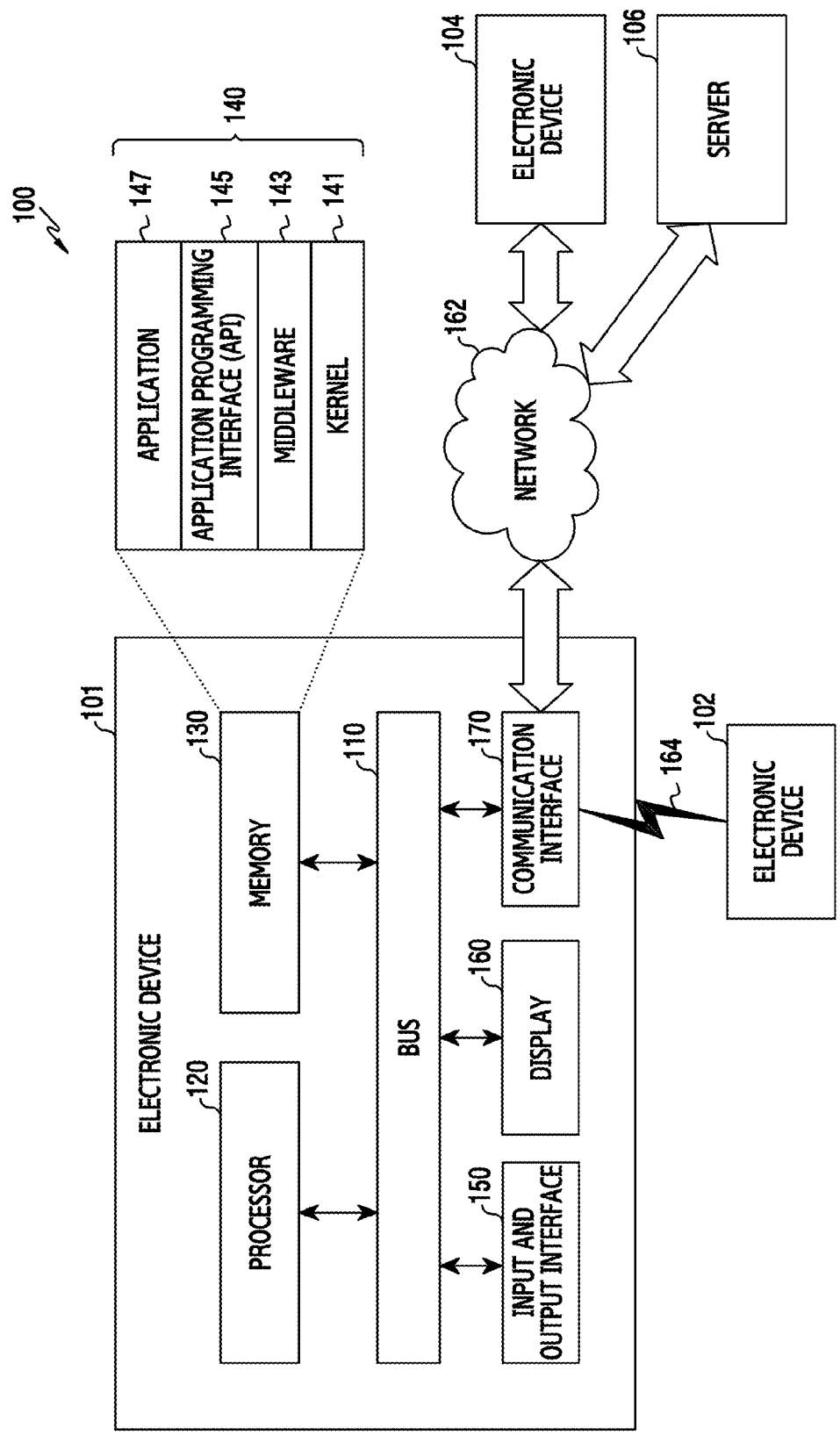
FIG. 1 is a block diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . ." may mean that the apparatus is "capable of . . ." along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

Referring to FIG. 1, an electronic device 101 in a network environment 100 is illustrated, according an embodiment of the present disclosure. The electronic device 101 includes a bus 110, a processor 120, a memory 130, an input/output (I/O) interface 150, a display 160, and a communication interface 170. The electronic device 101 may not include at least one of the above-described components or may further include other component(s). The bus 110 may interconnect the above-described components 110-170 and may include a circuit for conveying communications (e.g., a control message or data) among the above-described components. The processor 120 may include one or more of a central processing units (CPUs), an application processor (AP), or a communication processor (CP). The processor 120 may perform an operation or data processing associated with control and/or communication of at least one other component(s) of the electronic device 101.

The memory 130 may include a volatile and/or nonvolatile memory. The memory 130 may store instructions or data associated with at least one other component(s) of the electronic device 101. The memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be called an operating system (OS). The kernel 141 may control or manage system resources (e.g., the bus 110, the processor 120, the memory 130, etc.) that are used to execute operations or functions of other programs (e.g., the middleware 143, the API 145, and the application 147). Furthermore, the kernel 141 may provide an interface that allows the middleware 143, the API 145, or the application program 147 to access discrete components of the electronic device 101 so as to control or manage system resources.

The middleware 143 may perform a mediation role such that the API 145 or the application 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, etc.) of the electronic device 101, to at least one of the application 147, and may process the one or more task requests. The API 145 may be an interface through which the application 147 controls a function provided by the kernel 141 or the middleware 143, and may include, for example, at least one interface or function (e.g., an instruction) for a file control, a window control, image processing, a character control, etc. The I/O interface 150 may transmit an instruction or data, inputted from a user or another external device, to other component(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display various contents (e.g., a text, an image, a video, an icon, a symbol, and/or the like) to a user. The display 160 may include a touch screen and may receive a touch, gesture, proximity, or hovering input using an electronic pen or a portion of a user's body.

The communication interface 170 may establish communication between the electronic device 101 and a first external electronic device 102, a second external electronic device 104, or a server 106. For example, the communication interface 170 may be connected to a network 162 through wireless communication or wired communication to communicate with the second external electronic device 104 or a server 106.

The wireless communication may include cellular communication using at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), etc. The wireless communication may include at least one of wireless fidelity (WiFi), bluetooth (BT), BT low energy (BLE), Zigbee, near field communication (NFC), magnetic secure transmission, radio frequency, or body area network (BAN). The wireless communication may include GNSS. The GNSS may include, for example, a global positioning system (GPS), a global navigation satellite system (Glonass), a BeiDou navigation satellite system ("BeiDou") or Galileo, the European global satellite-based navigation system. Hereinafter, GPS and GNSS may be interchangeably used.

The wired communication may include at least one of a universal serial bus (USB), a high-definition multimedia interface (HDMI), a recommended standard-232 (RS-232), power line communication, or a plain old telephone service (POTS). The network 162 may include at least one of telecommunications networks a computer network (e.g., local area network (LAN) or wide area network (WAN)), an internet, or a telephone network.

Each of the first and second external electronic devices 102 and 104 may be a device of which the type is different from or the same as that of the electronic device 101. All or a part of operations that the electronic device 101 will perform may be executed by the electronic devices 102 and 104 or the server 106. Where the electronic device 101 executes any function or service automatically or in response to a request, the electronic device 101 may not perform the function or the service internally, but, alternatively additionally, it may request at least a portion of a function associated with the electronic device 101 at the electronic device 102 or 104 or the server 106) The electronic device 102 or 104 or the server 106 may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
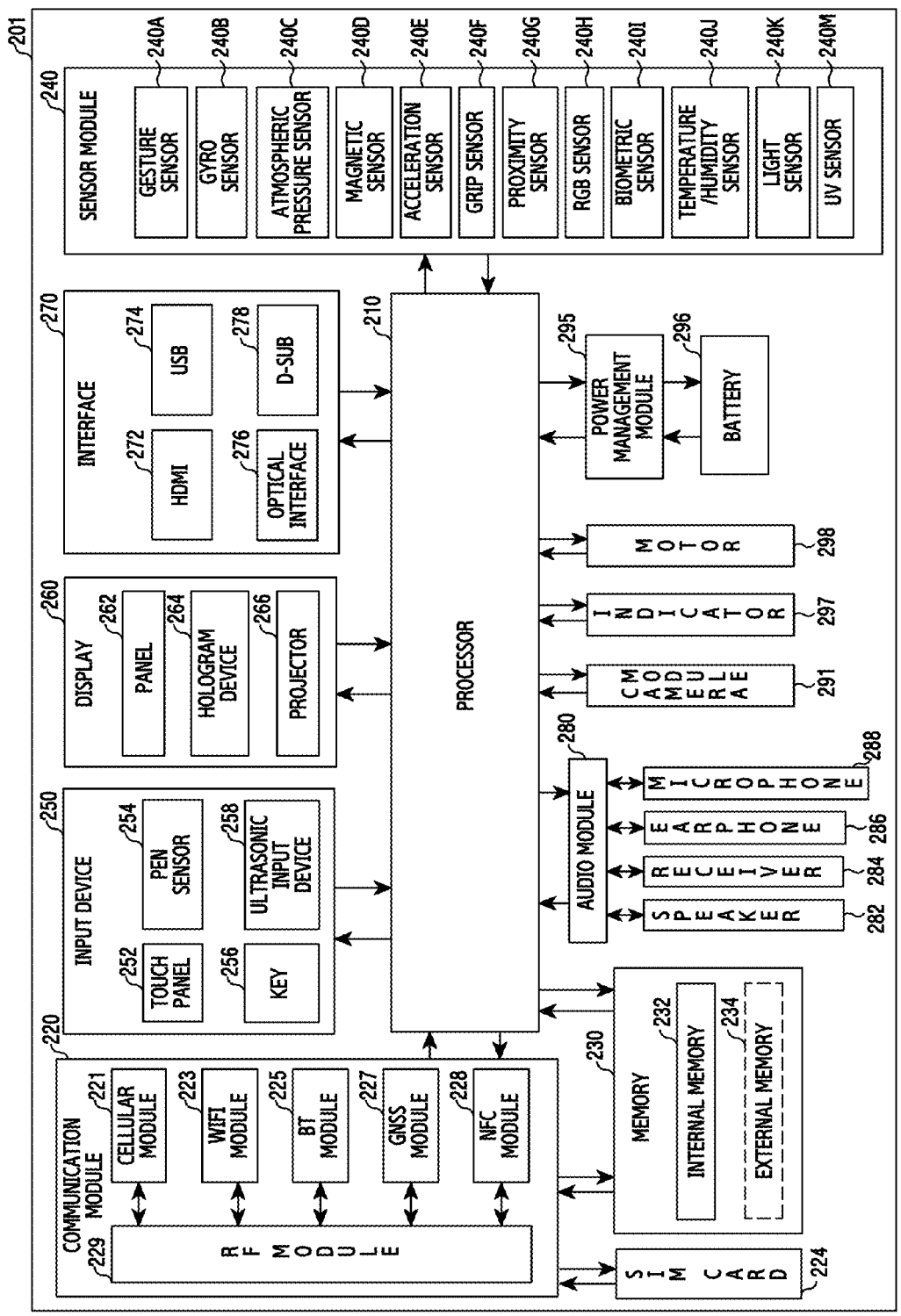
FIG. 2 is a block diagram of an electronic device, according to an embodiment of the present disclosure.

FIG. 2 is a block diagram of an electronic device 201, according to an embodiment of the present disclosure. The electronic device 201 may include all or a part of the electronic device 101 illustrated in FIG. 1. The electronic device 201 may include one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive an OS or an application to control a plurality of hardware or software components connected to the processor 210 and may process and compute a variety of data. The processor 210 may be implemented with a system on chip (SoC). The processor 210 may further include a graphic processing unit (GPU) and/or an image signal processor. The processor 210 may include at least a part (e.g., a cellular module 221) of components illustrated in FIG. 2. The processor 210 may load and process an instruction or data, which is received from at least one of the other components (e.g., a nonvolatile memory) in a volatile memory, and may store resulting data in a nonvolatile memory.

The communication module 220 may be configured the same as or similar to the communication interface 170. The communication module 220 may include a cellular module 221, a Wi-Fi module 223, a BT module 225, a GNSS module 227, an NFC module 228, and a radio frequency (RF) module 229. The cellular module 221 may provide voice communication, video communication, a character service, an Internet service or the like through a communication network. The cellular module 221 may perform discrimination and authentication of an electronic device 201 within a communication network using the SIM 224. The cellular module 221 may perform at least a portion of functions that the processor 210 provides. The cellular module 221 may include a CP. At least a portion (e.g., two or more components) of the cellular module 221, the Wi-Fi module 223, the BT module 225, the GNSS module 227, or the NFC module 228 may be included within one Integrated Circuit (IC) or an IC package. The RF module 229 may transmit and receive a communication signal (e.g., an RF signal). The RF module 229 may include a transceiver, a power amplifier module (PAM), a frequency filter, a low noise amplifier (LNA), an antenna, etc. At least one of the cellular module 221, the Wi-Fi module 223, the BT module 225, the GNSS module 227, or the NFC module 228 may transmit and receive an RF signal through a separate RF module. The SIM 224 be an embedded SIM and may include unique identification information (e.g., an integrated circuit card identifier (ICCID)) or subscriber information (e.g., integrated mobile subscriber identity (IMSI)).

The memory 230 may include an internal memory 232 or an external memory 234. For example, the internal memory 232 may include at least one of a volatile memory (e.g., a dynamic random access memory (DRAM), a static RAM (SRAM), or a synchronous DRAM (SDRAM)), and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 234 may include a flash drive, for example, compact flash (CF), secure digital (SD), micro secure digital (Micro-SD), mini secure digital (Mini-SD), extreme digital (xD), multimedia card (MMC), a memory stick, etc. The external memory 234 may be functionally or physically connected to the electronic device 201 through various interfaces.

The sensor module 240 may measure a physical quantity or may detect an operation state of the electronic device 201. The sensor module 240 may convert the measured or detected information to an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, or an ultra violet (UV) sensor 240M. Additionally or alternatively, the sensor module 240 may further include, for example, an e-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. The electronic device 201 may further include a processor which is a part of the processor 210 or independent of the processor 210 and is configured to control the sensor module 240. The processor 210 may control the sensor module 240 while the processor 210 remains at a sleep state.

The input device 250 may include a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, a part of a touch panel or may include an additional sheet for recognition. The key 256 may include a physical button, an optical key, a keypad, and the like. The ultrasonic input device 258 may detect an ultrasonic signal, which is generated from an input tool, through a microphone 288 and may check data corresponding to the detected ultrasonic signal.

The display 260 (may include a panel 262, a hologram device 264, a projector 266, and/or a control circuit to control these components. The panel 262 may be flexible, transparent, or wearable. The panel 262 and the touch panel 252 may be integrated into one or more modules. The panel 262 may include a pressure sensor (or a force sensor) for measuring an intensity of pressure on a user's touch. The pressure sensor may be integrated into the touch panel 252 or may be implemented with one or more sensors separate from the touch panel 252. The hologram device 264 may display a stereoscopic image in a space using a light interference phenomenon. The projector 266 may project light onto a screen so as to display an image. The screen may be arranged in the inside or the outside of the electronic device 201. The interface 270 may include a high-definition multimedia interface (HDMI) 272, a universal serial bus (USB) 274, an optical interface 276, or a D-subminiature (D-sub) 278. The interface 270 may be included in the communication interface 170 illustrated in FIG. 1. Additionally or alternatively, the interface 270 may include a mobile high definition link (MHL) interface, a SD card/multi-media card (MMC) interface, or an infrared data association (IrDA) standard interface.

The audio module 280 may convert a sound and an electric signal in dual directions. At least a portion of the audio module 280 may be included in the input/output interface 145 illustrated in FIG. 1. The audio module 180 may process sound information that is input or output through a speaker 282, a receiver 284, an earphone 286, or the microphone 288.

The camera module 291 is for shooting a still image or a video may include at least one image sensor (e.g., a front sensor or a rear sensor), a lens, an image signal processor (ISP), or a flash (e.g., an LED or a xenon lamp).

The power management module 295 may manage power of the electronic device 201. The power management module 295 may include a power management integrated circuit (PMIC), a charger IC, or a battery gauge. The PMIC may have a wired charging method and/or a wireless charging method. The wireless charging method may include a magnetic resonance method, a magnetic induction method or an electromagnetic method and may further include an additional circuit a coil loop, a resonant circuit, or a rectifier, etc. The battery gauge may measure a remaining capacity of the battery 296 and a voltage, current or temperature thereof while the battery is charged. The battery 296 may include, for example, a rechargeable battery or a solar battery.

The indicator 297 may display a specific state of the electronic device 201 or a portion thereof, such as a booting state, a message state, a charging state, etc.

The motor 298 may convert an electrical signal into a mechanical vibration and may generate vibration, haptic, and the like. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFlo™, etc.

Each of the above-mentioned elements of the electronic device may be configured with one or more components, and the names of the elements may be changed according to the type of the electronic device. The electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

The electronic device 201 may be the electronic device 101 illustrated in FIG. 1. For example, the electronic device 101 may set up call forwarding with the external electronic device 102.

When a call forwarding is requested by the external electronic device, the processor may identify information on an eSIM profile which is enabled in the external electronic device based on call forwarding-related information stored in the memory; transmit the information on the eSIM profile to the external electronic device via the communication module; and set up the call forwarding with the external electronic device using the eSIM profile based on the information on the eSIM profile.

The information on the eSIM profile may be information indicating a call forwarding state on the eSIM profile. According to an exemplary embodiment, the processor may identify the call forwarding state based on the call forwarding-related information and the information on the eSIM profile.

When the call forwarding state is a call forwarding enable state, the processor may set up the call forwarding between the electronic device and the external electronic device using the eSIM profile.

When the call forwarding state is a call forwarding disable state, the processor may download a new eSIM profile from a server and install the new eSIM profile in the external electronic device, may change the installed eSIM profile to an enable state, and may set up the call forwarding using the changed eSIM profile.

The processor may perform at least one operation of downloading at least one eSIM profile in the external electronic device, changing a state, and deleting.

The electronic device 201 may be the external electronic device 102. For example, the external electronic device 102 may set up call forwarding with the electronic device 101. According to an exemplary embodiment, the external electronic device 102 may include a communication module for communicating with the electronic device 101, and a processor.

When a call forwarding is requested, the processor may transmit a call forwarding request message to the electronic device via the communication module; in response to the call forwarding request message, may receive information on an eSIM profile which is enabled in the external electronic device from the electronic device; and may set up the call forwarding with the electronic device based on the information on the eSIM profile.

The information on the eSIM profile may be information indicating a call forwarding state of the eSIM profile. According to an exemplary embodiment, when the call forwarding state is a call forwarding enable state, the processor may set up the call forwarding using the eSIM profile.

When the call forwarding state is a call forwarding disable state and a new eSIM profile is downloaded from a server via the electronic device and installed, the processor may change the installed eSIM profile to an enable state, and set up the call forwarding using the changed eSIM profile.

The processor may perform at least one operation of downloading at least one eSIM profile in the external electronic device, changing a state, and deleting.

The processor may guide at least one of a usage limit and a replacement of the eSIM profile based on at least one of availability of the call forwarding according to a prepaid charge of the eSIM profile and a location of the external electronic device, and a tariff of the external electronic device.

Figure 3:
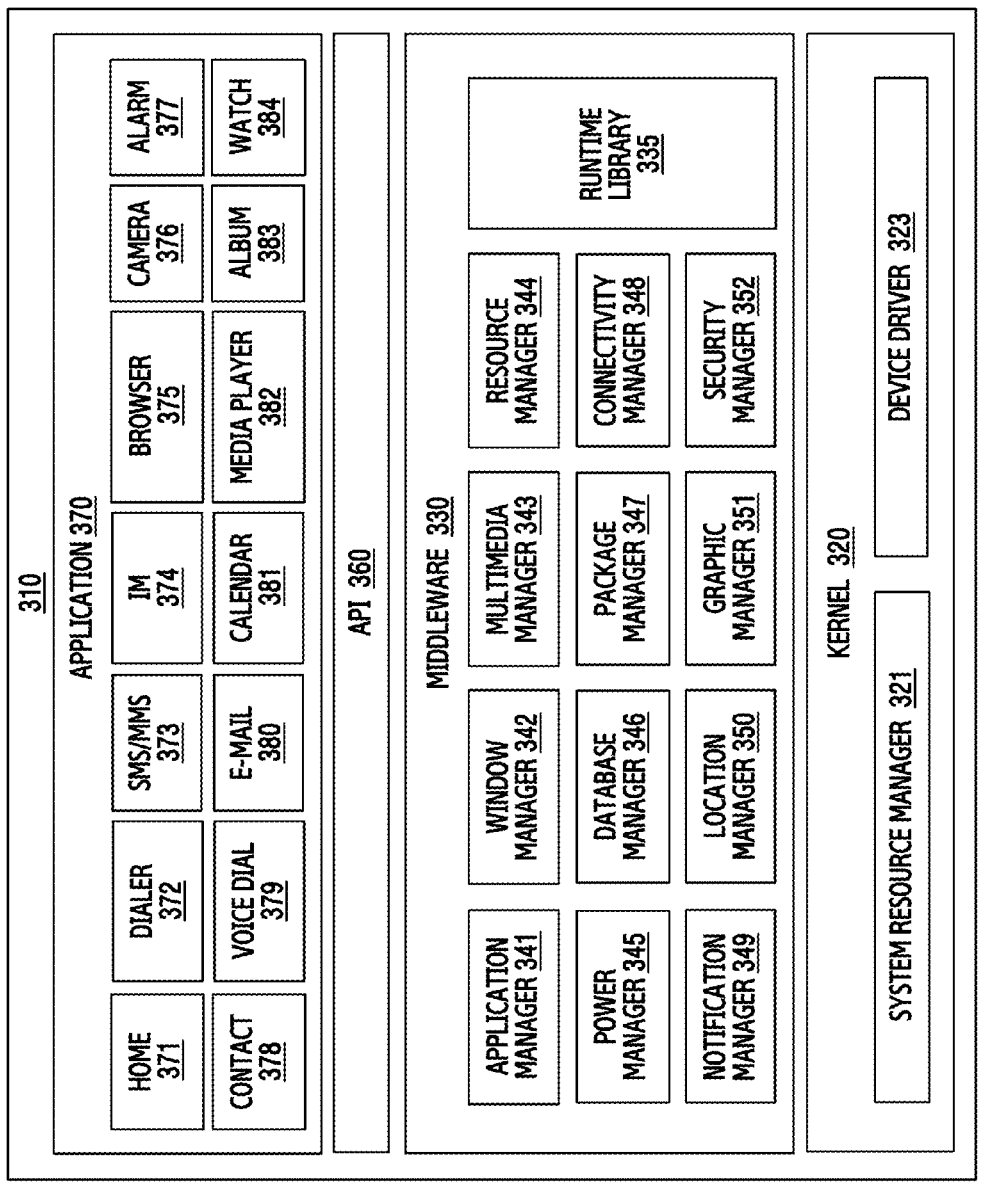
FIG. 3 is a block diagram of a program module, according to an embodiment of the present disclosure.

FIG. 3 is a block diagram of a program module, according to an embodiment of the present disclosure. The program module 310 may include an OS to control resources associated with an electronic device (e.g., an electronic device 101), and/or diverse applications (e.g., the application 147) driven on the OS. The OS may be, for example, Android™, iOS™, Windows™, Symbian™, Tizen™, or Bada™.

Referring to FIG. 3, the program module 310 includes a kernel 320, a middleware 330, an application programming interface (API) 360, and/or an application 370. At least a part of the program module 310 may be preloaded on an electronic device or may be downloadable from an external electronic device (e.g., an electronic device 102 or 104, a server 106, and the like).

The kernel 320 may include a system resource manager 321 or a device driver 323. The system resource manager 321 may perform control, allocation, or retrieval of system resources. The system resource manager 321 may include a process managing part, a memory managing part, or a file system managing part. The device driver 323 may include a display driver, a camera driver, a BT driver, a common memory driver, an USB driver, a keypad driver, a Wi-Fi driver, an audio driver, or an inter-process communication (IPC) driver.

The middleware 330 may provide a function which the application 370 needs in common, or may provide diverse functions to the application 370 through the API 360 to allow the application 370 to efficiently use limited system resources of the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which is used by a compiler to add a new function through a programming language while the application 370 is being executed. The runtime library 335 may perform input/output management, memory management, or capacities about arithmetic functions. The application manager 341 may manage a life cycle of the application 370. The window manager 342 may manage a graphical user interface (GUI) resource which is used in a screen. The multimedia manager 343 may identify a format necessary for playing diverse media files, and may perform encoding or decoding of media files by using a codec suitable for the format. The resource manager 344 may manage a source code of the application 370 or a space of a memory. The power manager 345 may manage a capacity of a battery or power, and may provide power information for an operation of an electronic device. The power manager 345 may interwork with a basic input/output system (BIOS). The database manager 346 may generate, search for, or modify database which is to be used in the application 370. The package manager 347 may install or update an application which is distributed in the form of a package file.

The connectivity manager 348 may manage wireless connection. The notification manager 349 may display or notify an event such as arrival message, promise, or proximity notification. The location manager 350 may manage location information of an electronic device. The graphic manager 351 may manage a graphic effect that is provided to a user, or manage a user interface relevant thereto. The security manager 352 may provide a general security function necessary for system security or user authentication.

The middleware 330 may further include a telephony manager for managing a voice or video call function of the electronic device, or a middleware module that combines diverse functions of the above-described components. The middleware 330 may provide a module specialized to each OS kind. The middleware 330 may remove a part of the preexisting components, dynamically, or may add a new component thereto.

The API 360 may be, for example, a set of API programming functions and may be provided with a configuration which is variable depending on an OS. For example, in the case where an OS is the Android™ or the iOS™, it may be permissible to provide one API set per platform. In the case where an OS is Tizen™, it may be permissible to provide two or more API sets per platform.

The application 370 includes a home application 371, a dialer application 372, an SMS/MMS application 373, an instant message (IM) application 374, a browser application 375, a camera application 376, an alarm application 377, a contact application 378, a voice dial application 379, an e-mail application 380, a calendar application 381, a media player application 382, am album application 383, and a watch application 384. The application 370 may also include a health care application (e.g., measuring an exercise quantity or blood sugar), or an application for providing environment information (e.g., atmospheric pressure, humidity, or temperature).

The application 370 may include an information exchanging application to support information exchange between the electronic device and an external electronic device. The information exchanging application may include, for example, a notification relay application for transmitting specific information to the external electronic device, or a device management application for managing the external electronic device. For example, the notification relay application may include a function of transmitting notification information, which arise from other applications, to an external electronic device, or may receive notification information from an external electronic device and provide the notification information to a user.

The device management application may install, delete, or update at least one function (e.g., turn-on/turn-off of an external electronic device itself (or a part of components) or adjustment of brightness (or resolution) of a display) of the external electronic device which communicates with the electronic device, or an application running in the external electronic device. The application 370 may include an application (e.g., a health care application of a mobile medical device) which is assigned in accordance with an attribute of the external electronic device. The application 370 may include an application which is received from an external electronic device.

At least a portion of the program module 310 may be implemented (e.g., executed) by software, firmware, hardware (e.g., a processor 210), or a combination of two or more thereof. A module for performing one or more functions may include modules, programs, routines, sets of instructions, or processes, or the like.

Figure 4:
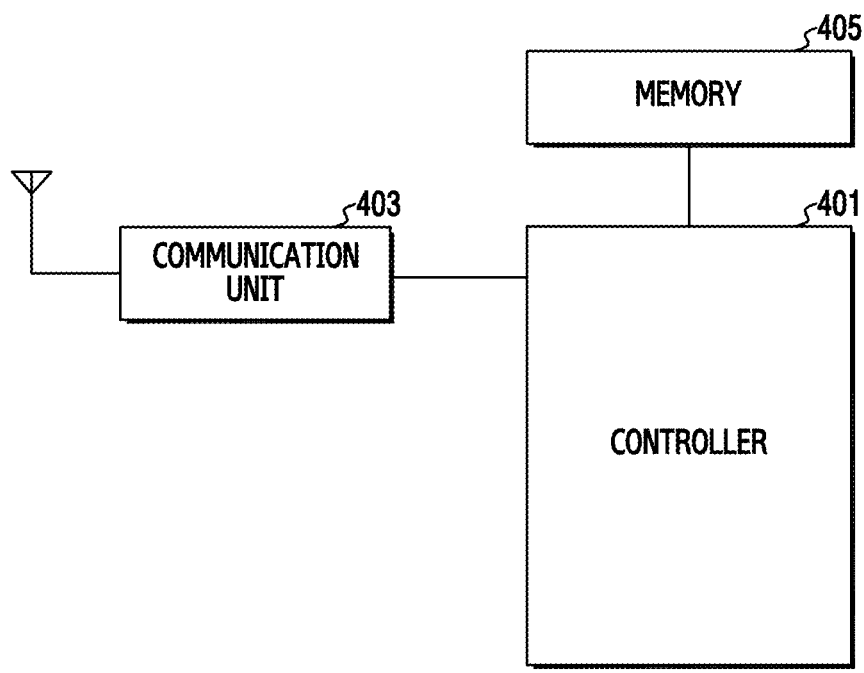
FIG. 4 is a block diagram of a server, according to an embodiment of the present disclosure.

FIG. 4 is a block diagram of a server, according to an embodiment of the present disclosure. For example, the server may be the server 106 of FIG. 1.

Referring to FIG. 4, the server 106 may include a controller 410, a communication unit 403, and a memory 405. The communication unit 403 may support cellular communication and may transmit or receive signals to or from at least one electronic device within a cell. For example, the communication unit 403 may transmit or receive signals to or from the electronic device 101. The communication unit 403 may include an RF processor and a baseband processor. The RF processor may perform a function of transmitting and receiving signals via a radio channel, such as transforming a band of a signal, or amplifying. That is, the RF processor may up convert a baseband signal provided from the baseband processor into an RF band signal and then transmit the signal via an antenna, and may down convert an RF band signal received via the antenna into a baseband signal. The RF processor may include a transmission filter, a reception filter, an amplifier, a mixer, an oscillator, a digital to analog converter (DAC), an analog to digital converter (ADC), etc.

The communication unit 403 may transmit or receive signals to or from at least one electronic device within a cell via a network (for example, the network 162).

The baseband processor may perform a function of converting between a baseband signal and a bit string according to a physical layer standard of a system. When transmitting data, the baseband processor may generate complex symbols by encoding and modulating a transmission bit string. In addition, when receiving data, the baseband processor may restore a reception bit string by demodulating and decoding a baseband signal provided from the RF processor. When transmitting data according to an orthogonal frequency division multiplexing (OFDM) method, the baseband processor may generate complex symbols by encoding and modulating the transmission bit string, map the complex symbols onto sub carriers, and then compose OFDM symbols by an inverse fast Fourier transform (IFFT) operation and inserting a cyclic prefix (CP). In addition, when receiving data, the baseband processor may divide a baseband signal provided from the RF processor on an OFDM symbol basis, restore signals mapped onto the sub carriers through an FFT operation, and then restore the reception bit string by demodulating and decoding. The baseband processor and the RF processor may transmit or receive signals as described above. For example, the communication unit 403 may be referred to as a transmitter, a receiver, a transceiver, or a wireless communication interface.

The memory 405 may store data such as a basic program for operating the server 105, an application program, setting information, or the like. The memory 405 may store an eSIM profile. The eSIM profile may have the same meaning as a profile or may indicate information which is included in an SIM application in a profile and packaged in the form of software. The eSIM profile may indicate a set of a file structure, data, and an application which exist on an eSIM (or an embedded universal IC card (eUICC)) of the external electronic device 102 or are provided to an eSIM.

The controller 401 may control the overall operations of the server 106. The controller 401 may register an eSIM profile. The controller 401 may receive an eSIM profile registration request message from a telecommunication operator. For example, the eSIM profile registration request message may be a message for requesting the server 106 to register an eSIM profile. The eSIM profile registration request message may include an input file. For example, the input file may include an event and a mobile network operator identifier (MNOID). The event may include an eSIM card identifier (integrated circuit card ID (ICCID)), an event type, and a profile state.

The controller 401 may register the eSIM profile using the input file, and generate an event ID and an output file. The output file may be a file indicating a result of registering the eSIM profile. The event ID may be an ID for generally and uniquely identifying a management event of the eSIM profile.

The controller 401 may generate an activation code based on the event ID and transmit the activation code to the telecommunication operator. The activation code may include information which is referred to as a contract with an MNO or an eSIM profile. For example, the activation code may be displayed in the form of a QR code.

The controller 401 may transmit the eSIM profile to the electronic device 101. The controller 401 may select one of the stored eSIM profiles according to a request of the electronic device 101, and transmit the selected eSIM profile to the electronic device 101. The controller 401 may receive an event ID from the electronic device 101, and select one of the stored eSIM profiles based on the received event ID.

Figure 5:
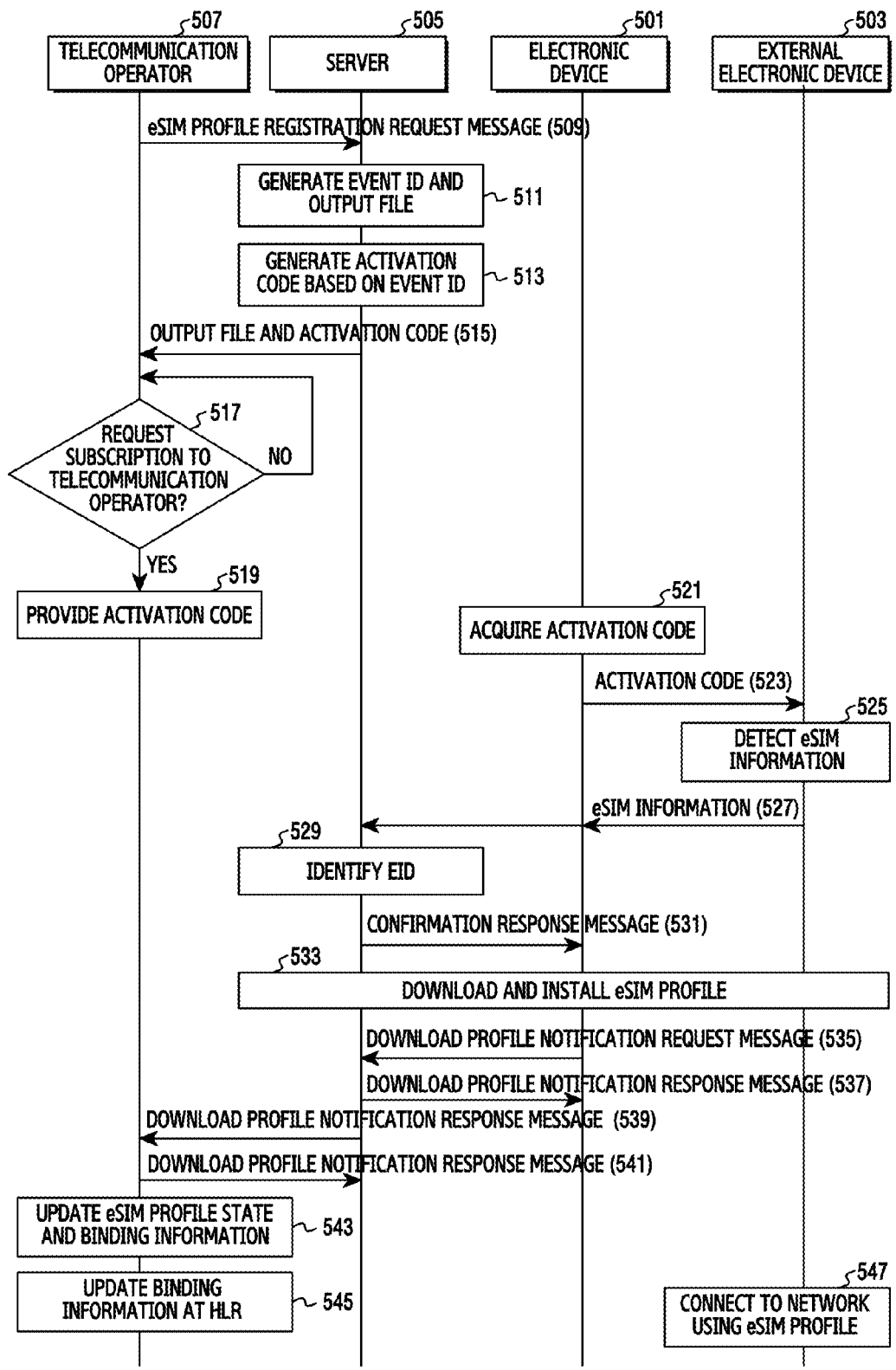
FIG. 5 is a signaling diagram for downloading an eSIM profile in a communication system, according to an embodiment of the present disclosure.

FIG. 5 is a signaling diagram for downloading an eSIM profile in a communication system, according to an embodiment of the present disclosure. The communication system may include an electronic device 501, an external electronic device 503, a server 505, and a telecommunication operator 507. The electronic device 501 may be the electronic device 101 shown in FIG. 1. The external electronic device 503 may be the external electronic device 102 shown in FIG. 1. The server 505 may be the server 106 shown in FIG. 1.

In step 509, the telecommunication operator 507 transmits an eSIM profile registration request message to the server 505. The eSIM profile may indicate a set of a file structure, data, and an application which exist on an eSIM (or eUICC) of the external electronic device 102 or is provided to the eSIM.

In step 511, the server 505 registers an eSIM profile using an input file, and generates an event ID and an output file. The event ID may be an ID for generally and uniquely identifying a management event of the eSIM profile. The input file may include an event and an MNOID.

In step 513, the server 505 generates an activation code based on the event ID. The activation code may include information which is referred to as a contract with an MNO or an eSIM profile. The activation code may be displayed in the form of a QR code. In step 515, the server 505 may transmit the output file and the activation code to the telecommunication operator 507.

In steps s 513 and 515, the server 505 generates the activation code and transmits the activation code to the telecommunication operator 507. The server 505 may transmit the event ID to the telecommunication operator 507, and the telecommunication operator 507 may generate the activation code using the event ID.

In step 517, the telecommunication operator 507 determines whether subscription to the telecommunication operator is requested or not. The telecommunication operator subscription request may be received from various electronic devices (for example, a computer or a notebook PC) which is able to communicate with the telecommunication operator 507.

When it is determined that the subscription to the telecommunication operator is requested, the method proceeds to step 519, or otherwise, the method returns to step 517.

In step 519, the telecommunication operator 507 provides the activation code. For example, the telecommunication operator 507 may provide the activation code to an electronic device which requests subscription to the telecommunication operator. The telecommunication operator 507 may provide the activation code in the form of a QR code.

In step 521, the electronic device 501 acquires the activation code from an electronic device which requests subscription to the telecommunication operator. The electronic device which requests subscription to the telecommunication operator may be an electronic device which is able to communicate with the telecommunication operator 507 and receives the activation code.

The electronic device which requests subscription to the telecommunication operator may display the activation code. The electronic device 501 may photograph the activation code using a camera module (for example, the camera module 291) and acquire the activation code by analyzing the photographed activation code.

In step 521, the electronic device 501 acquires the activation code from the electronic device which requests subscription to the telecommunication operator. The electronic device 501 may directly communicate with the telecommunication operator 507 and acquire the activation code.

In step 523, the electronic device 501 transmits the activation code to the external electronic device 503. In step 525, the external electronic device 503 acquires eUICC information (or eSIM information) from an eUICC (or eSIM). The eUICC information may include a protected eUICC ID (EID), certs_eUICC, and eUICCinfo which are data field values of the eUICC.

The protected EID may include a sign (for example, sign_eUICC) for verifying the eUICC included in the external electronic device 503. The certs_eUICC may include a certificate for certifying the eUICC included in the external electronic device 503.

In step 527, the external electronic device 503 transmits the eUICC information to the server 505 via the electronic device 501. In step 529, the server 505 identifies the EID of the external electronic device 503 using the eUICC information. The server 505 may identify sign_eUICC in the protected EID. The sign_eUICC may indicate a unique sign allocated to the eUICC.

In step 531, the server 505 generates a confirmation response message and transmit the same to the electronic device 501. The confirmation response message may include a result of identifying the EID (for example, a success or a failure). When the EID is normally identified, the server 505 may generate a confirmation response message including a success. In another example, when the EID is not identified or fails to be identified, the server 505 may generate a confirmation response message including a failure.

In step 533, the electronic device 501 performs a procedure of downloading and installing an eSIM profile with the external electronic device 503 and the server 505. The electronic device 501 may download an eSIM profile from the server 505, and transmit the downloaded eSIM profile to the external electronic device 503. In addition, the external electronic device 503 may install the received eSIM profile.

In step 535, the electronic device 501 transmits a download profile notification request message to the server 505 to notify that the eSIM profile is completely downloaded and installed. In step 537, the server 505 transmits a download profile notification response message to the electronic device 501 in response to the download profile notification request message.

In step 539, the server 505 transmits a download profile notification request message to the telecommunication operator 507 to notify that the eSIM profile is completely downloaded and installed. In step 541, the telecommunication operator 507 transmits a download profile notification response message to the server 505 in response to the download profile notification request message.

In step 543, the telecommunication operator 507 updates an eSIM profile install state and binding information. The eSIM profile install state may be a state indicating that the eSIM profile is installed. The binding information may include at least one of the activation code, the event ID, the EID and the ICCID.

In step 545, the telecommunication operator 507 stores the binding information in a home location register (HLR). The telecommunication operator 507 may update the binding information at the HLR on the installed eSIM profile.

In step 547, the external electronic device 503 connects to a network (for example, a mobile telecommunication network). The external electronic device 503 may connect to a network using the installed eSIM profile.

The eSIM profile may be in a disable state. When the eSIM profile is changed to an enable state by the user or automatically, the external electronic device 503 may connect to a network using the eSIM profile in the enable state.

Figure 6:
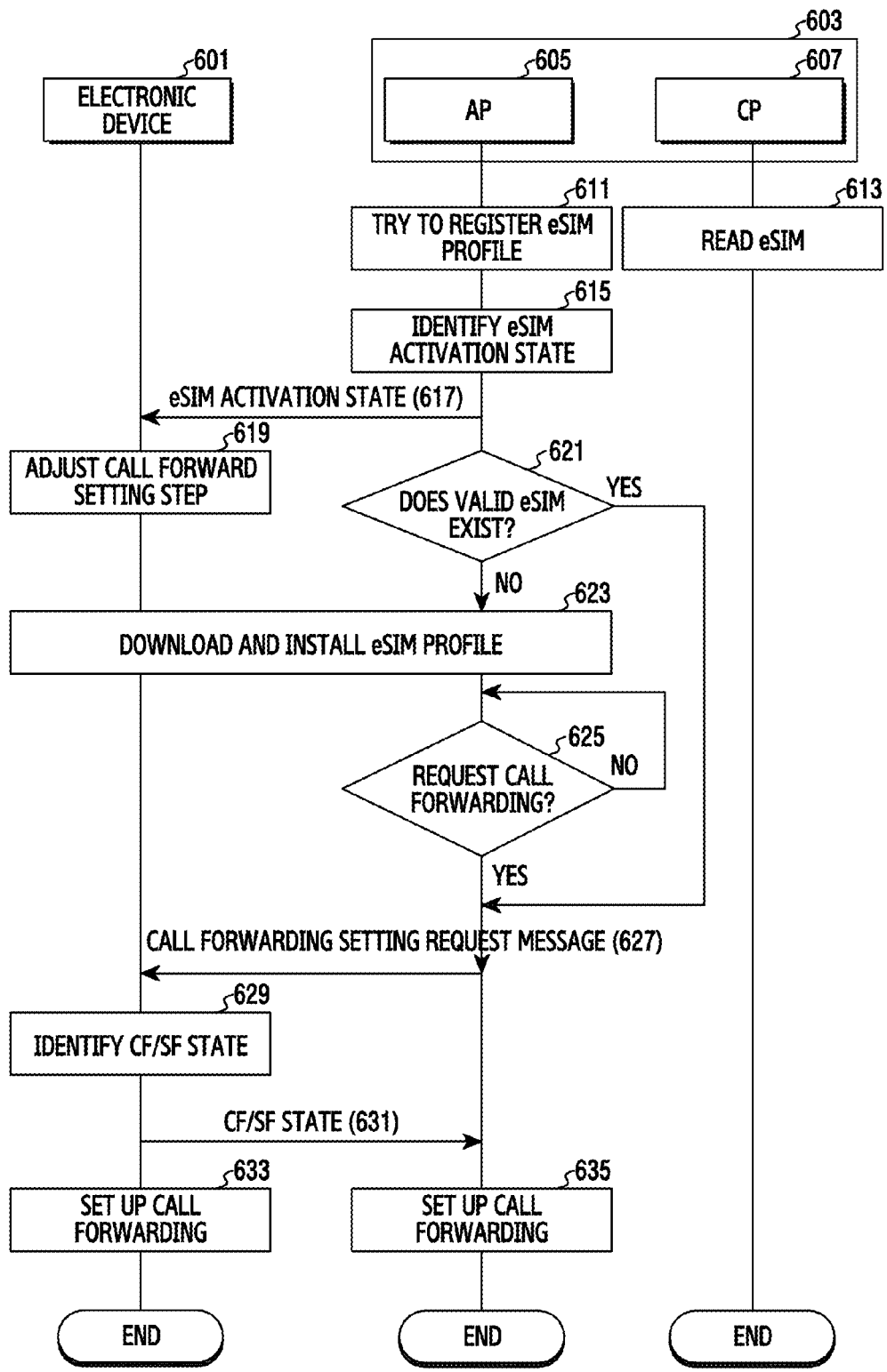
FIG. 6 is a signaling diagram for setting up call forwarding in a communication system, according to an embodiment of the present disclosure.

FIG. 6 is a signaling diagram for setting up call forwarding in a communication system, according to an embodiment of the present disclosure. The communication system may include an electronic device 601 and an external electronic device 603. The electronic device 601 may be the electronic device 101 shown in FIG. 1. The external electronic device 603 may be the external electronic device 102 shown in FIG. 1.

Referring to FIG. 6, in step 611, the external electronic device 603 (for example, an AP 605) tries to register an eSIM profile. When a voice-related function provision is requested by a user at a setup wizard step, the electronic device 601 may request the external electronic device 603 to register an eSIM profile, and the external electronic device 603 may try to register the eSIM profile.

The setup wizard step may be a procedure of setting the external electronic device 603 when the electronic device 602 is initially connected with the external electronic device 603. The electronic device 601 may be connected with the external electronic device 603 using short-range wireless communication (for example, BT).

In step 613, the external electronic device 603 (for example, a CP 607) reads an eSIM (or eUICC). In step 615, the external electronic device 603 determines an eSIM activation state based on a result of reading the eSIM. The eSIM activation state may include information concerning whether there exists an eSIM in the external electronic device 603. In step 617, the external electronic device 603 transmits the eSIM activation state to the electronic device 601.

In step 619, the electronic device 601 adjusts a call forwarding setting step based on the eSIM activation state information. The electronic device 601 may determine whether to continue or stop the call forwarding setting step based on the eSIM activation state information.

When the eSIM activation state information indicates that there exists an eSIM in the external electronic device 603, the electronic device 601 may continue the subsequent call forwarding setting step and display a next screen. The next screen may be a screen for requesting an input of an activation code.

In another example, when the eSIM activation state information indicates that there does not exist an eSIM in the external electronic device 603, the electronic device 601 may stop the call forwarding setting step and perform a next procedure of the setup wizard or display a home screen. The home screen may be a home screen of an application for managing the external electronic device 603. The home screen may include at least one menu for setting up various functions of the external electronic device 603.

In step 621, the external electronic device 603 determines whether there exists a valid eSIM. For example, the valid eSIM may indicate that there exists an eSIM in the external electronic device 603 and an eSIM profile corresponding to the eSIM is registered (or stored). An invalid eSIM may indicate that there exists an eSIM in the external electronic device 603, but an eSIM profile corresponding to the eSIM is not registered (or stored).

When it is determined that there exists a valid eSIM, the external electronic device 603 may proceed to operation 625, or otherwise, for example, when there exists an invalid eSIM, the external electronic device 603 may proceed to operation 623.

In step 623, the external electronic device 603 downloads and installs an eSIM profile. The external electronic device 603 may download and install an eSIM profile through steps 521 to 533 of FIG. 5.

The external electronic device 603 may request an eSIM profile download from the electronic device 601. The electronic device 601 may output an activation code input request screen according to the eSIM profile download request. When an activation code is inputted, the electronic device 601 may download the eSIM profile from a server (for example, the server 106) using the activation code, and may transmit the eSIM profile to the external electronic device 603. The external electronic device 603 may install the eSIM profile.

In step 625, the external electronic device 603 determines whether call forwarding is requested by the user or not. When a request for changing the downloaded eSIM profile from the disable state to the enable state is inputted by the user, the external electronic device 603 may determine that call forwarding is requested.

When it is determined that the call forwarding is requested, the external electronic device 603) the method proceeds to step 627, or otherwise, the method repeats step 625.

In step 627, the external electronic device 603 transmits a call forwarding setting request message to the electronic device 601. The call forwarding setting request message may include a mobile country code (MCC), a mobile network code (MNC), and a mobile station international ISDN number (MSISDN) regarding the eSIM profile in the enable state.

In step 629, the electronic device 601 identifies a call forwarding/SMS forwarding ("CF/SF") state based on information included in the call forwarding setting request message. The CF/SF state may indicate an enable state or a disable state of call forwarding.

The electronic device 601 may store information related to call forwarding. The electronic device 601 may store a call forwarding table. The call forwarding table may be as shown in Table 1 presented below:

TABLE 1

| MCC | MNC | MSISDN | CF Type | CF Code | Remark |
|---|---|---|---|---|---|
| 450 | 05 | xxx | 4 | T-Share | SKT |
| 450 | 08 | xxx | 2 | *71MSISDN call | KT |
| 262 | 09 | xxx | 1 | *21*MSISDN# | VDF D2 |
| 208 | 02 | xxx | 1 | *21*MSISDN# | Org Fr |

The call forwarding table may include a CF type and a CF code according to an MCC, an MNC, and an MSISDN. The CF type may indicate whether a telecommunication operator is capable of call forwarding. When the CF type is 4, the CF type may indicate that the telecommunication operator is capable of call forwarding. In another example, when the CF type is 2, the CF type may indicate that the telecommunication operator is not capable of call forwarding.

The CF code may indicate a method in which a telecommunication operator performs call forwarding. The CF code of Vodafone and Orange may be *21*MSISDN#. For example, the MSISID may be a telephone number of an electronic device which is desired to receive a telephone call (for example, the external electronic device 603). In another example, the CF code of SKT may be a solution of its own, known as T-Share. In still another example, the CF code of KT may be *71MSISDNcall.

The electronic device 601 may determine whether automatically or manually set-up call forwarding is enabled or not, and determine the CF/SF state in consideration of whether call forwarding is enabled using the call forwarding table and whether set-up call forwarding is enabled or not. When the call forwarding is determined to be enabled when the call forwarding table is considered and the call forwarding is set to be disabled in the electronic device 601, the electronic device 601 may determine the CF/SF state as the disable state (NO). In another example, when the call forwarding is determined to be enabled when the call forwarding table is considered and the call forwarding is set to be enabled, the electronic device 601 may determine the CF/SF state as the enable state (OK).

In step 631, the electronic device 601 transmits the CF/SF state to the external electronic device 603. In step 633, the electronic device 601 sets up the call forwarding with the external electronic device 603 using the eSIM profile based on the CF/SF state. When the CF/SF state is the call forwarding enable state, the electronic device 601 may set up the call forwarding with the external electronic device 603 using a telephone number allocated to the eSIM profile. In another example, when the CF/SF state is the call forwarding disable state, the electronic device 601 may not set up the call forwarding with the external electronic device 603.

In step 635, the external electronic device 603 sets up the call forwarding with the electronic device 601 using the eSIM profile based on the CF/SF state. When the CF/SF state is the call forwarding enable state, the external electronic device 603 may set up the call forwarding with the electronic device 601 using the telephone number allocated to the eSIM profile. In another example, when the CF/SF state is the call forwarding disable state, the external electronic device 603 may not set up the call forwarding with the electronic device 601.

Figure 7:
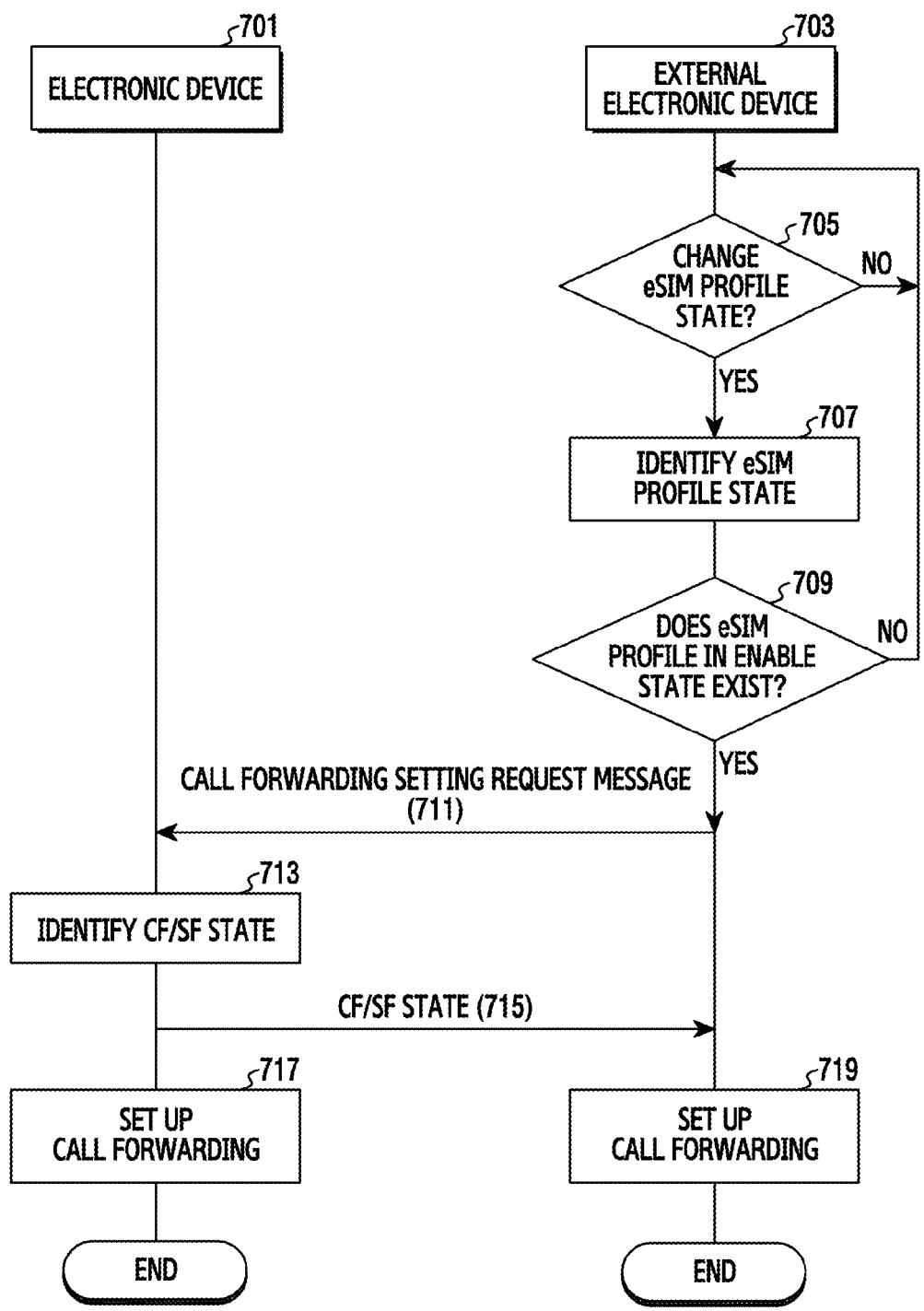
FIG. 7 is a signaling diagram for setting up call forwarding in a communication, system according to an embodiment of the present disclosure.

FIG. 7 is a signaling diagram for setting up call forwarding in a communication system, according to an embodiment of the present disclosure. The communication system may include an electronic device 701 and an external electronic device 703. The electronic device 701 may be the electronic device 101 shown in FIG. 1. The external electronic device 703 may be the external electronic device 102 shown in FIG. 1.

In step 705, the external electronic device 703 determines whether an eSIM profile state is changed or not. The eSIM profile state may be changed by a user through a menu regarding an eSIM profile. The state of the eSIM profile may be one of a disable state and an enable state.

When it is determined that the state of the eSIM profile is changed, the method proceeds to step 707, or otherwise, the method repeats step 705.

In step 707, the external electronic device 703 identifies the eSIM profile state. The external electronic device 703 may identify the states of all of the eSIM profiles.

In step 709, the external electronic device 703 may determine whether there exists an eSIM profile in the enable state based on the identified states of the eSIM profiles. When it is determined that there exists an eSIM profile in the enable state, the method proceeds to step 711, or otherwise, resumes operation 705 to wait for a change of the state of the eSIM profile. In this case, the external electronic device 703 may display a pop-up window informing that there does not exist an eSIM profile in the enable state and thus it is impossible to set up call forwarding.

In step 711, the external electronic device 703 transmits a call forwarding setting request message to the electronic device 701. In step 713, the electronic device 701 identifies a CF/SF state based on information included in the call forwarding setting request message.

The electronic device 701 may determine whether call forwarding is enabled or not using a call forwarding table and may identify whether automatically or manually set-up call forwarding is enabled or not. The electronic device 701 may determine the CF/SF state in consideration of whether call forwarding is enabled or not using the call forwarding table and whether set-up call forwarding is enabled or not.

In step 715, the electronic device 701 transmits the CF/SF state to the external electronic device 703. In step 717, the electronic device 701 sets up call forwarding with the external electronic device 703 using the eSIM profile based on the CF/SF state. In step 719, the external electronic device 703 sets up call forwarding with the electronic device 701 using the eSIM profile based on the CF/SF state.

Figure 8A:
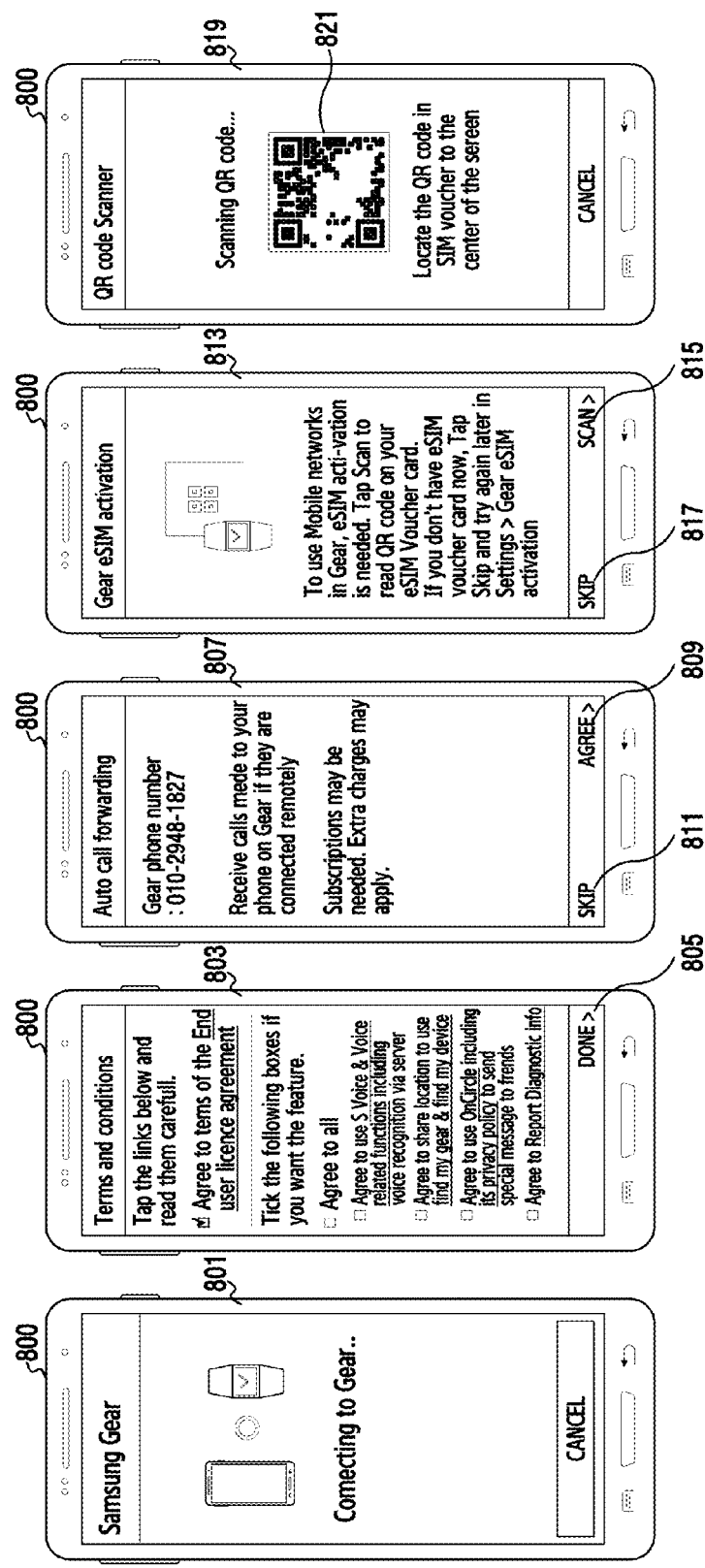
FIGS. 8A and 8B are diagrams of a procedure of downloading an eSIM in an electronic device, according to an embodiment of the present disclosure.
Figure 8B:
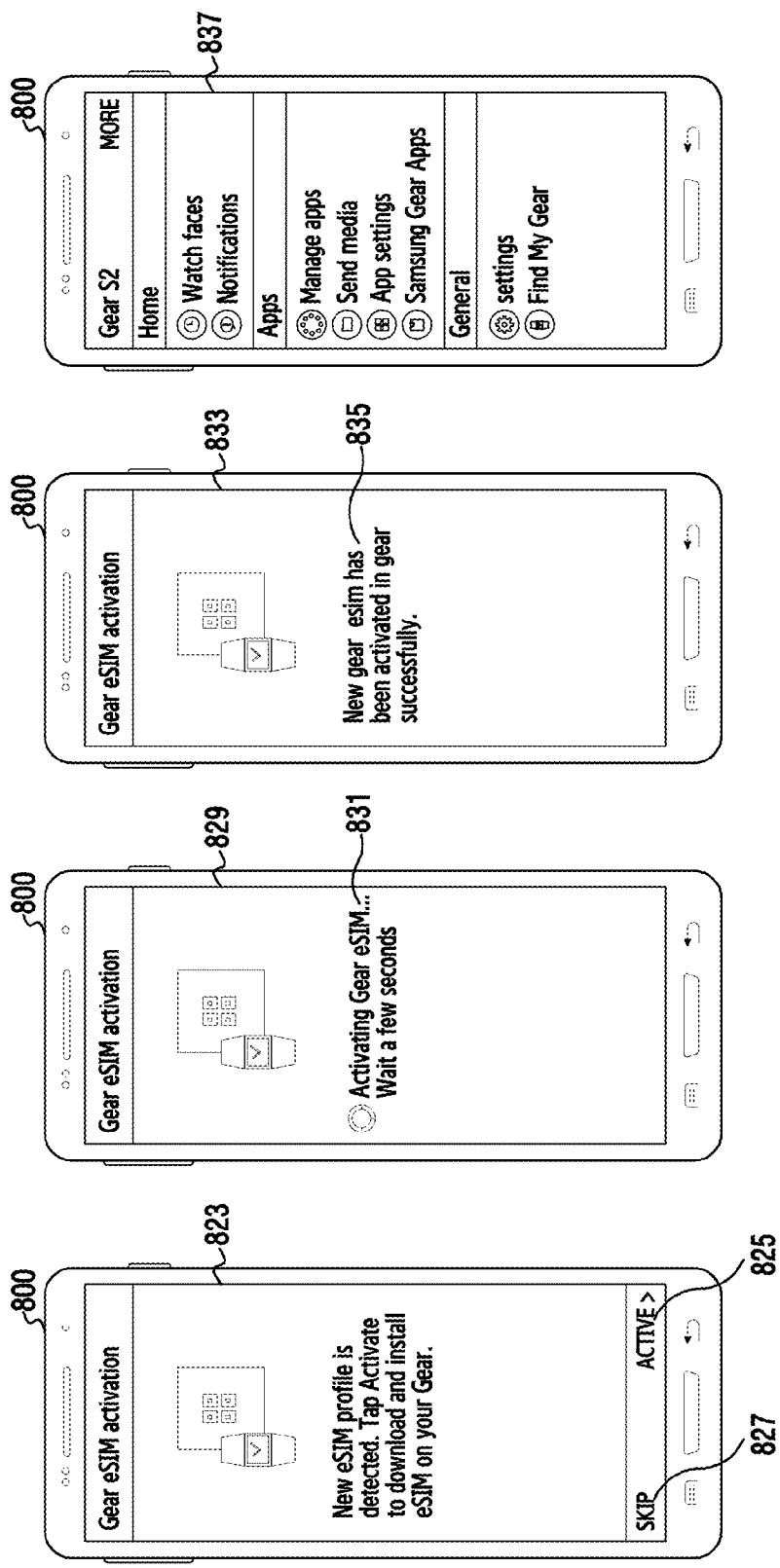

FIGS. 8A and 8B are diagrams of a procedure of downloading an eSIM profile in an electronic device 800, according to an embodiment of the present disclosure. The electronic device 800 may be the electronic device 101 shown in FIG. 1.

The electronic device 800 may download an eSIM profile at a setup wizard step, and may set up call forwarding with an external electronic device (for example, the external electronic device 102 of FIG. 1) using the downloaded eSIM profile. For example, the setup wizard step may be a procedure of setting the external electronic device 102 when the electronic device 800 and the external electronic device 102 are initially connected with each other. The electronic device 800 may be connected with the external electronic device 102 using short-range wireless communication (for example, BT).

When an application for managing the external electronic device 102 is executed, the electronic device 800 may display a screen 801 while connecting to the external electronic device 102. When the electronic device 800 connects to the external electronic device 102, the electronic device 800 may display a contract associated with the external electronic device 102 and a contract agreement icon 805 as shown on a screen 803.

When the contract agreement icon 805 is selected by a user and there exists an eSIM in the external electronic device 102, the electronic device 800 may display a message inquiring whether the user wants to use a call forwarding function, an agreement icon 809 to agree with the inquiry, and a skip icon 811 to skip the inquiry as shown on a screen 807.

When the skip icon 811 is selected by the user, the electronic device 800 may proceed with a next procedure of the setup wizard or may display a home screen 837. In another example, when the agreement icon 809 is selected by the user, the electronic device 800 may display a guide message to activate the eSIM, a skip icon 817 to skip activating the eSIM, and a scan icon 815 to scan an activation code to activate the eSIM as shown on a screen 813. The guide message may include a message inquiring whether the user has an eSIM voucher card for activating the eSIM. The eSIM voucher card may include an activation code for activating the eSIM and the activation code may be displayed in the form of a QR code.

When the skip icon 817 is selected by the user, the electronic device 800 may proceed with the next procedure of the setup wizard or may display the home screen 837. In another example, when the scan icon 815 is selected by the user, a QR code area 821 may be displayed to receive an input of the activation code in the form of the QR code as shown on a screen 819.

When the activation code is inputted, the electronic device 800 may include a message inquiring whether the user wants to download and install an eSIM profile in the external electronic device 102, a skip icon 827 to skip installing the eSIM profile, and an activation icon 825 to activate installing the eSIM profile as shown on a screen 823.

When the skip icon 827 is selected by the user, the electronic device 800 may proceed with the next procedure of the setup wizard or may display the home screen 837. In another example, when the activation icon 825 is selected by the user, the electronic device 800 may display a popup window 831 informing that the eSIM of the external electronic device 102 is being activated as shown on a screen 829.

When the activation of the eSIM is completed, the electronic device 800 may display a popup window 835 indicating the completion of the activation of the eSIM as shown on a screen 833. In addition, the electronic device 800 may display the home screen 837 as shown on a screen 837.

The procedure of downloading the eSIM profile shown in FIGS. 8A and 8B may be performed in a different order or may be omitted.

Figure 9:
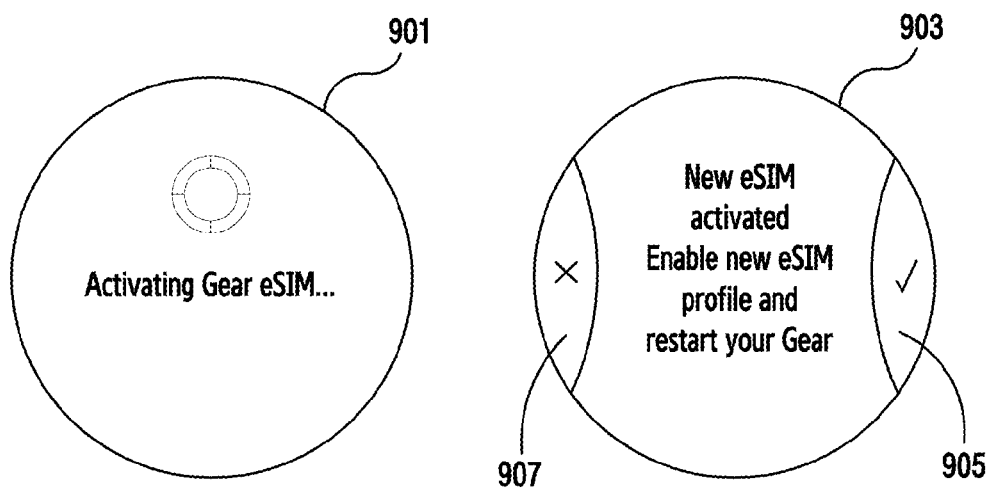
FIG. 9 is a diagram of a procedure of changing an eSIM profile to an enable state in an external electronic device, according to an embodiment of the present disclosure.

FIG. 9 is a diagram of a procedure of changing an eSIM profile to an enable state in an external electronic device, according to an embodiment of the present disclosure. The external electronic device may be the external electronic device 102 shown in FIG. 1. The external electronic device 102 may be a wearable device which provides a short-range communication function and a cellular communication function. The wearable device may be a watch.

The external electronic device 102 may activate an eSIM and change an eSIM profile to an enable state.

The external electronic device 102 may display a message indicating that an eSIM is being activated as shown on a screen 901. Activating the eSIM may refer to downloading, by the electronic device 101 of FIG. 1, an eSIM profile from the server 106, and installing the eSIM profile in the external electronic device 102. When the electronic device 101 displays the screen 829 of FIG. 8B, the external electronic device 102 may display the screen 901.

The external electronic device 102 may activate the eSIM through the electronic device 101. The external electronic device 102 may activate the eSIM by directly communicating with the server 106 and directly downloading and installing the eSIM profile.

When the eSIM is activated, the external electronic device 102 may display a message informing that the eSIM is activated and inquiring whether the user wants to change the downloaded eSIM profile to an enable state and to restart the external electronic device 102, an accept icon 905 to accept the request of the inquiry, and a decline icon 907 to decline the request of the inquiry as shown on a screen 903.

When the decline icon 907 is selected by the user, the external electronic device 102 may display a home screen or a screen showing a clock. The home screen may be a screen which displays various functions of the external electronic device 102 on a tool bar.

When the accept icon 905 is selected by the user, the external electronic device 102 may change the downloaded eSIM profile to the enable state and restart. In addition, the external electronic device 102 may set up call forwarding with the electronic device 101 using the eSIM profile in the enable state.

When the eSIM is activated, the external electronic device 102 may not display the screen 903.

Figure 10:
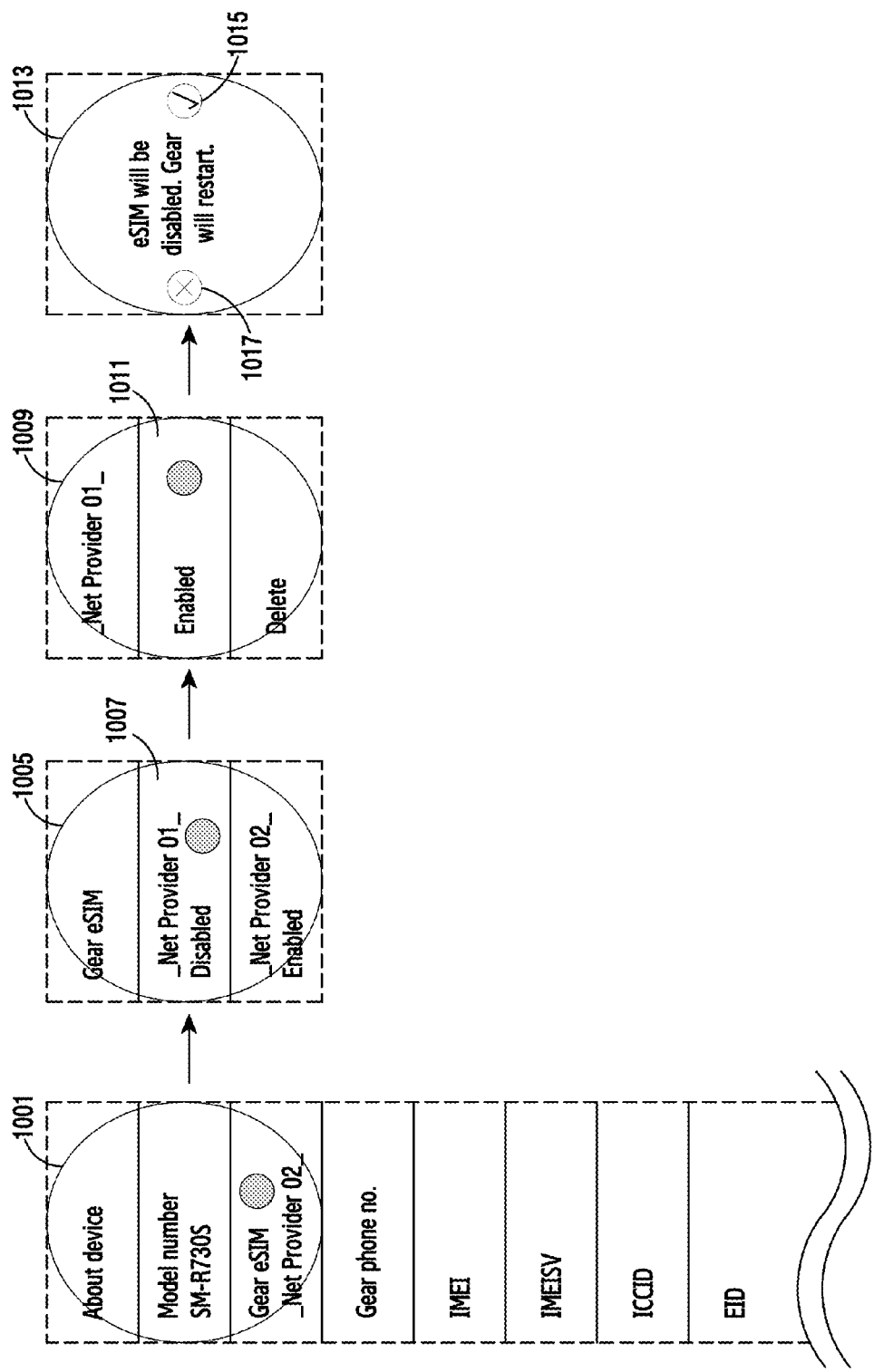
FIG. 10 is a diagram of a procedure of changing the state of an eSIM profile in an electronic device, according to an embodiment of the present disclosure.

FIG. 10 is a diagram of a procedure of changing the state of an eSIM profile in an external electronic device, according to an embodiment of the present disclosure. The external electronic device may be the external electronic device 102 shown in FIG. 1. The external electronic device 102 may be a wearable device which provides a short-range communication function and a cellular communication function. The wearable device may be a watch.

Downloading an eSIM profile at a setup wizard step may be skipped by a user. When an eSIM profile is downloaded using a setting menu for managing the external electronic device 102, the external electronic device 102 may change the eSIM profile downloaded through the setting menu to an enable state, and may set up call forwarding using the eSIM profile in the enable state.

The dashed boxes shown in FIG. 10 indicate setting menus of the external electronic device, and the circles may indicate areas which are displayed on the display of the external electronic device 102 from among the setting menus. The display form of the external electronic device 102 may have a circular shape. The display form of the external electronic device 102 may have a rectangular shape, a polygonal shape, or an oval shape.

The external electronic device 102 may display the setting menus as shown on a screen 1001. The setting menus may include a menu related to a model name of the external electronic device 102, a menu 1003 related to the eSIM of the external electronic device 102, and a menu related to a telephone number of the external electronic device 102.

When the eSIM-related menu 1003 is selected by the user, the external electronic device 102 may display a menu 1007 related to at least one eSIM profile (for example, Net Provider 01, Net Provider 02) stored in the external electronic device 102.

When the menu 1007 related to the eSIM profile (for example, Net Provider 01) is selected by the user, the external electronic device 102 may display a state change menu of the selected eSIM profile as shown on a screen 1009. When Net Provider 01 in the disable state is selected, the external electronic device 102 may display a state change menu 1011 inquiring whether to change the state of Net Provider 01 to the enable state, and a delete menu inquiring whether to delete Net Provider 01.

When the state change menu 1011 is selected by the user, the external electronic device 102 may display a message inquiring whether to change the eSIM profile (for example, Net Provider 02) currently used to the disable state, and whether to restart the external electronic device 102, an accept icon 1015 to accept the request of the inquiry, and a decline icon 1017 to decline the request of the inquiry, as shown on a screen 1013.

When the decline icon 1017 is selected by the user, the external electronic device 102 may maintain the current state of the eSIM profile as it is and display the screen 1001. When the accept icon 1015 is selected by the user, the external electronic device 102 may change the eSIM profile (for example, Net Provider 02) which is stored in the external electronic device 102 and is currently used to the disable state. In addition, when the external electronic device 102 may change the selected eSIM profile (for example, Net Provider 01) from the disable state to the enable state, and then may restart the external electronic device 102.

The external electronic device 102 may transmit a call forwarding setting request message including information related to the selected eSIM profile (for example, Net Provider 01) to the electronic device 101. For example, the information related to the eSIM profile is related to the eSIM profile and may include an MCC, an MNC, and an MSISDN related to the eSIM profile.

In addition, the external electronic device 102 may receive a CF/SF state from the electronic device 101 in response to the call forwarding setting request message. The external electronic device 102 may set up call forwarding with the electronic device 101 using the eSIM profile in the enable state based on the CF/SF state.

As described above, the external electronic device 102 may change the state of each eSIM profile stored or may individually delete the eSIM profile. In FIG. 10, the external electronic device 102 may manage (download, change the state, and delete) the eSIM profile. The electronic device 101 may manage the eSIM profile stored in the external electronic device 102.

Figure 11:
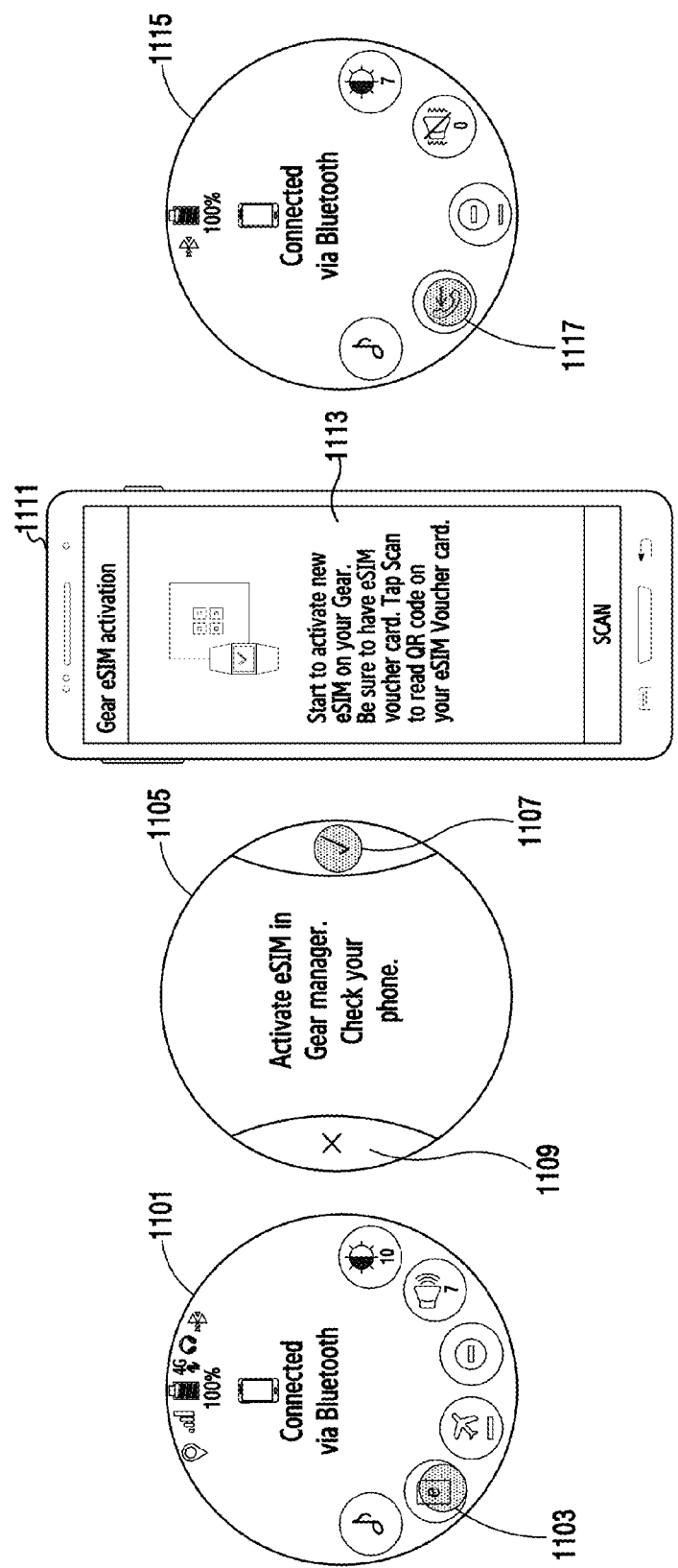
FIG. 11 is a diagram of a procedure of activating an eSIM profile in an external electronic device, according to an embodiment of the present disclosure.

FIG. 11 is a diagram of a procedure of activating an eSIM profile in an external electronic device, according to an embodiment of the present disclosure. The external electronic device may be the external electronic device 102 shown in FIG. 1. The external electronic device 102 may be a wearable device which provides a short-range communication function and a cellular communication function. The wearable device may be a watch.

The external electronic device 102 may register an eSIM profile and change the eSIM profile to the enable state, and set up a call forwarding function using the eSIM profile in the enable state.

When the eSIM profile is not registered (or stored), the external electronic device 102 may display an eSIM profile non-registration or non-use icon 1103 as shown on a screen 1101. The eSIM profile non-registration or non-use icon 1103 may indicate that any eSIM profile is not registered (or stored) in the external electronic device 102 or all of the registered eSIM profiles are disabled.

When the eSIM Profile non-registration or non-use icon 1303 is selected by the user, the external electronic device 102 may display a message inquiring whether a user wants to download an eSIM profile from the server 106 via the electronic device 101 and activate the eSIM profile, an accept icon 1107 to accept the request of the inquiry, and a decline icon 1109 to decline the request of the inquiry as shown on a screen 1105.

When the decline icon 1109 is selected by the user, the external electronic device 102 may display the screen 1101 again. In another example, when the accept icon 1107 is selected by the user, the external electronic device 102 may transmit an eSIM profile download request message to the electronic device 101.

The electronic device 101 which receives the eSIM profile download request message may display a message 1113 requesting an input of an activation code including information for downloading the eSIM profile as shown on a screen 1111. The activation code may be a QR code of an eSIM voucher card.

When the activation code is inputted, the electronic device 101 may receive the eSIM profile from the server 106 using the activation code, and may transmit the received eSIM profile and a CF/SF state to the external electronic device 102.

The external electronic device 102 may set up call forwarding with the electronic device 101 using the activated eSIM profile based on the CS/SF state. When the call forwarding is completely set up, the external electronic device 102 may output a notification that the call forwarding function is enabled. For example, the external electronic device 102 may display a call forwarding icon 1117 as shown on a screen 1115.

In the middle of providing the call forwarding function using an existing eSIM profile, when a new eSIM profile is downloaded and changed to the enable state, the external electronic device 102 may re-set up the call forwarding function using the new eSIM profile instead of using the existing eSIM profile.

Figure 12:
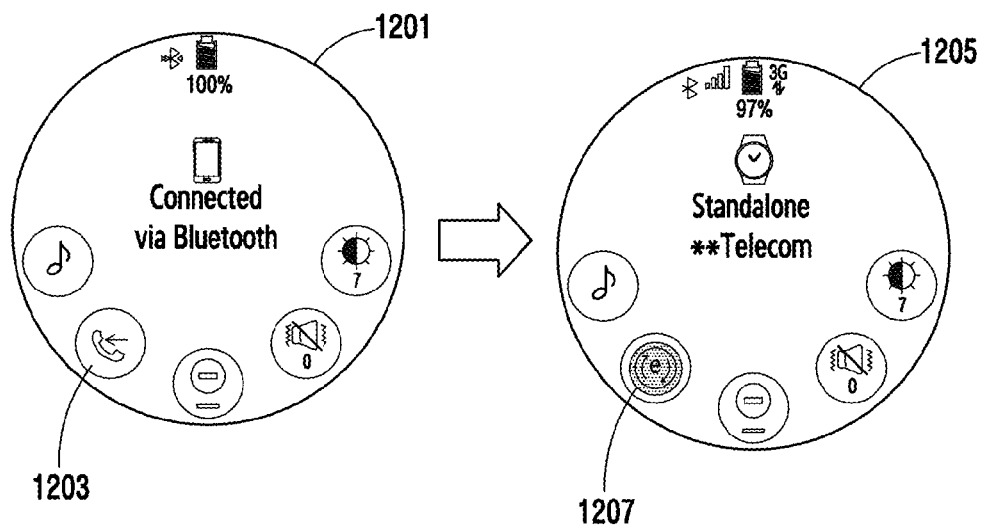
FIG. 12 is a diagram of a screen for informing a need to replace an eSIM profile in an external electronic device, according to an embodiment of the present disclosure.

FIG. 12 is a diagram of a screen for informing a need to replace an eSIM profile in an external electronic device, according to an embodiment of the present disclosure.

The external electronic device may be the external electronic device 102 shown in FIG. 1. The external electronic device 102 may be a wearable device which provides a short-range communication function and a cellular communication function. The wearable device may be a watch type device.

The external electronic device 102 may output a notification that a call forwarding function is enabled. For example, the external electronic device 102 may display a call forwarding icon 1203 as shown on a screen 1201.

The call forwarding icon 1203 may be changed according to an environment and a state of an eSIM. The environment and the state of the eSIM may include availability of the call forwarding function or a tariff depending on a situation of each region or each location. The changed icon may be used as an intuitive informing index for the user.

When a plurality of eSIM profiles are registered at the external electronic device 102, the external electronic device 102 may determine that it should set up the call forwarding function by replacing currently activated eSIM profile 2 with eSIM profile 1 according to movement to another region (for example, from user's country to another country). In this case, the external electronic device 102 may display an eSIM profile replacement icon 1207 to inform the user of the need to replace the eSIM profile.

When a plurality of eSIM profiles are registered at the external electronic device 102, the external electronic device 102 may provide a call forwarding function using the plurality of eSIM profiles according to movement to another location (for example, from user's country to another country). In this case, the external electronic device 102 may determine that it should set up the call forwarding function by replacing currently activated eSIM profile 2 with eSIM profile 1 based on tariffs subscribed to a plurality of telecommunication operators corresponding to the plurality of eSIM profiles.

When the tariff of currently activated eSIM profile 2 is more expensive than the tariff of currently deactivated eSIM profile 1, the external electronic device 102 may determine that it should set up the call forwarding function by replacing currently activated eSIM profile 2 with eSIM profile 1. In addition, the external electronic device 102 may display the eSIM profile replacement icon 1207 to inform the user of the need to replace the eSIM profile as shown on a screen 1205.

When the eSIM profile replacement icon 1207 is selected by the user, the external electronic device 102 may display an eSIM profile replacement menu. In this case, the external electronic device 102 may display an optimal eSIM profile from among the plurality of eSIM profiles in consideration of the environment and the state of the eSIM such that the user can select the optimal eSIM profile. In addition, when the eSIM profile is completely replaced, the external electronic device 102 may set up call forwarding with the electronic device 101 using the replaced eSIM profile.

When the eSIM profile replacement icon 1207 is selected by the user, the external electronic device 102 may automatically select an eSIM profile from among the plurality of eSIM profiles in consideration of the environment and the state of the eSIM, and may set up call forwarding with the electronic device 101 using the selected eSIM profile.

Figure 13:
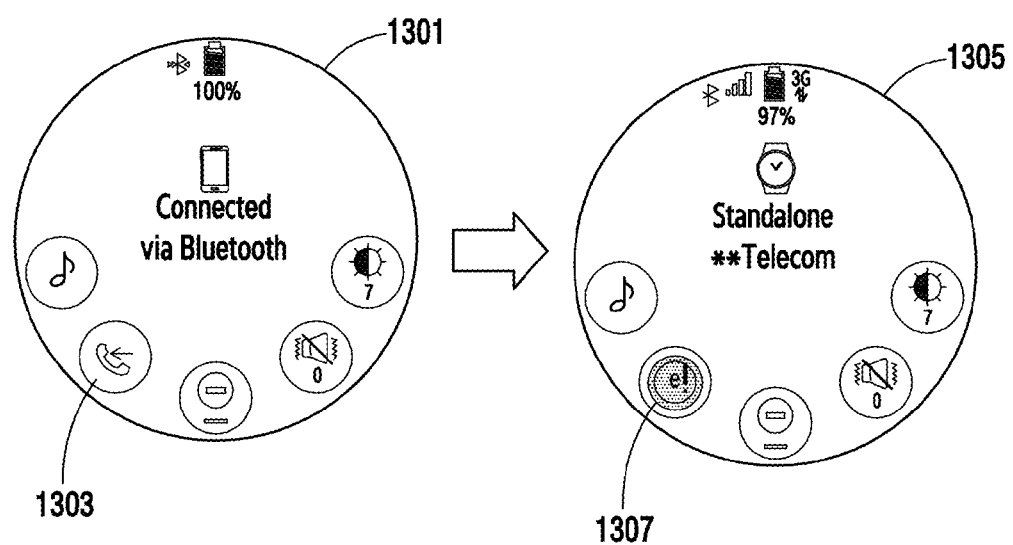
FIG. 13 is a diagram of a screen for informing a usage limit of an eSIM profile in an external electronic device, according to an embodiment of the present disclosure.

FIG. 13 is a diagram of a screen for informing a usage limit of an eSIM profile in an external electronic device. The external electronic device may be the external electronic device 102 shown in FIG. 1. The external electronic device 102 may be a wearable device which provides a short-range communication function and a cellular communication function. The wearable device may be a watch.

The external electronic device 102 may output a notification that a call forwarding function is enabled. The external electronic device 102 may display a call forwarding icon 1303 as shown on a screen 1301.

The external electronic device 102 may download a prepaid card on a specific telecommunication operator and normally perform a call forwarding function. When a prepaid charge registered at the prepaid card is used by more than a specified amount of money or is all used, the external electronic device 102 may output a notification on a usage limit of an eSIM profile on the specific telecommunication operator.

The external electronic device 102 may display a usage limit icon 1307 of the eSIM profile as shown on a screen 1307. In another example, the external electronic device 102 may display a message to limit usage of the eSIM profile or output a corresponding voice. In still another example, the external electronic device 102 may output a currently remaining balance of the prepaid charge with the usage limit icon 13017 (or message) of the eSIM profile.

When the usage limit icon 1307 is selected by the user, the external electronic device 102 may display an eSIM profile replacement menu. In addition, when the eSIM profile is completely replaced, the external electronic device 102 may set up call forwarding with the electronic device (for example, the electronic device 101) so as to set up the call forwarding function using the replaced eSIM profile.

A method for setting up a call forwarding with an external electronic device in an electronic device includes: receiving a request for the call forwarding from the external electronic device; in response to the received request, identifying information related to at least one eSIM profile which is enabled in the external electronic device based on call forwarding-related information which is stored in the electronic device; transmitting the information to the external electronic device; and setting up the call forwarding using the information.

The information may be information indicating a call forwarding state of the eSIM profile. Identifying the information related to the eSIM profile may include identifying the call forwarding state based on the call forwarding-related information stored in the electronic device and the information related to the eSIM profile.

Setting up the call forwarding may include, when the call forwarding state is a call forwarding enable state, setting up the call forwarding using the eSIM profile.

The method may further include: when the call forwarding state is a call forwarding disable state, downloading a new eSIM profile from a server and installing the new eSIM profile in the external electronic device; changing the installed eSIM profile to an enable state; and setting up the call forwarding using the changed eSIM profile.

The method may further include performing at least one operation of downloading at least one eSIM profile in the external electronic device, changing a state, and deleting.

A method for setting up a call forwarding with an electronic device in an external electronic device includes: when a call forwarding is requested, transmitting a call forwarding request message to the electronic device; in response to the call forwarding request message, receiving information related to at least one eSIM profile which is enabled in the external electronic device; and setting up the call forwarding using the information.

The information may be information indicating a call forwarding state on the eSIM profile. Setting up the call forwarding may include, when the call forwarding sate is a call forwarding enable state, setting up the call forwarding using the eSIM profile.

The method may further include: when the call forwarding state is a call forwarding disable state and a new eSIM profile is downloaded from a server via the electronic device and installed, changing the installed eSIM profile to an enable state; and setting up the call forwarding using the changed eSIM profile.

The method may further include performing at least one operation of downloading at least one eSIM profile in the external electronic device, changing a state, and deleting.

The method may further include guiding at least one of a usage limit and a replacement of the eSIM profile based on at least one of availability of the call forwarding according to a prepaid charge of the eSIM profile and a location of the external electronic device, and a tariff of the external electronic device.

At least a portion of an apparatus (e.g., modules or functions thereof) or a method (e.g., operations) may be implemented by instructions stored in a non-transitory computer-readable storage media (for example, the memory 130) in the form of a programmable module. When the instruction is executed by a processor (e.g., the processor 120), the processor may perform a function corresponding to the instruction. A non-transitory computer-readable recording media may include a hard disk, a floppy disk, a magnetic media (e.g., a magnetic tape), an optical media (e.g., compact disc read only memory (CD-ROM) and a digital versatile disc (DVD)), a magneto-optical media (e.g., a floptical disk), and an internal memory. Also, the instruction may include a code generated by a compiler or a code executable by an interpreter.

A module or a programming module may include at least one of the above elements, or a portion of the above elements may be omitted, or additional other elements may be further included. Operations performed by a module, a programming module, or other elements may be executed sequentially, in parallel, repeatedly, or in a heuristic method. Also, a portion of operations may be executed in different sequences, omitted, or other operations may be added.

As herein described, there is provided an apparatus and a method for managing a plurality of eSIM profiles in an electronic device in order to enhance user's convenience.

As herein described, there is provided an apparatus and a method for setting up call forwarding using one of a plurality of eSIM profiles in an electronic device.

As herein described, there is provided an apparatus and a method for managing a plurality of eSIM profiles in an external electronic device in order to enhance user's convenience.

As herein described, there is provided an apparatus and a method for setting up call forwarding using one of a plurality of eSIM profiles in an external electronic device.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a memory;
   a communication module configured to communicate with an external electronic device; and
   a processor configured to:
   when a call forwarding is requested by the external electronic device, identify information on an embedded subscriber identity module (eSIM) profile of the external electronic device, based on call forwarding-related information stored in the memory;
   transmit the information on the eSIM profile to the external electronic device via the communication module; and
   set up the call forwarding with the external electronic device using the eSIM profile based on the information on the eSIM profile.

2. The electronic device of claim 1, wherein the information on the eSIM profile is information indicating a call forwarding state on the eSIM profile, and
   wherein the processor is further configured to identify the call forwarding state based on the call forwarding-related information and the information on the eSIM profile.

3. The electronic device of claim 2, wherein, when the call forwarding state is a call forwarding enable state, the processor is further configured to set up the call forwarding between the electronic device and the external electronic device using the eSIM profile.

4. The electronic device of claim 2, wherein, when the call forwarding state is a call forwarding disable state, the processor is further configured to download a new eSIM profile from a server and install the new eSIM profile in the external electronic device, to change the installed eSIM profile to an enable state, and to set up the call forwarding using the changed eSIM profile.

5. The electronic device of claim 1, wherein the processor is further configured to perform at least one of downloading at least one eSIM profile in the external electronic device, changing a state of the call forwarding on the eSIM profile, and deleting the eSIM profile.

6. An external electronic device comprising:
   a communication module configured to communicate with an electronic device; and
   a processor configured to:
   when a call forwarding is requested, transmit a call forwarding request message to the electronic device via the communication module;
   in response to the call forwarding request message, receive information on an embedded subscriber identity module (eSIM) profile of the external electronic device, from the electronic device; and
   set up the call forwarding with the electronic device based on the information on the eSIM profile.

7. The external electronic device of claim 6, wherein the information on the eSIM profile is information indicating a call forwarding state of the eSIM profile, and wherein, when the call forwarding state is a call forwarding enable state, the processor is further configured to set up the call forwarding using the eSIM profile.

8. The external electronic device of claim 7, wherein, when the call forwarding state is a call forwarding disable state and a new eSIM profile is downloaded from a server via the electronic device and installed, the processor is further configured to change the installed eSIM profile to an enable state, and set up the call forwarding using the changed eSIM profile.

9. The external electronic device of claim 6, wherein the processor is further configured to perform at least one downloading at least one eSIM profile in the external electronic device, changing a state of the call forwarding on the eSIM profile, and deleting the eSIM profile.

10. The external electronic device of claim 6, wherein the processor is further configured to guide at least one of a usage limit and a replacement of the eSIM profile based on at least one of availability of the call forwarding according to a prepaid charge of the eSIM profile and a location of the external electronic device, and a tariff of the external electronic device.

11. A method for setting up a call forwarding with an external electronic device in an electronic device, the method comprising:

receiving a request for the call forwarding from the external electronic device;

in response to the received request, identifying information related to at least one embedded subscriber identity module (eSIM) profile of the external electronic device based on call forwarding-related information which is stored in the electronic device;

transmitting the information to the external electronic device; and setting up the call forwarding using the information.

12. The method of claim 11, wherein the information is information indicating a call forwarding state of the eSIM profile, and wherein identifying the information related to the eSIM profile comprises identifying the call forwarding state based on the call forwarding-related information stored in the electronic device and the information related to the eSIM profile.

13. The method of claim 12, wherein setting up the call forwarding comprises, when the call forwarding state is a call forwarding enable state, setting up the call forwarding using the eSIM profile.

14. The method of claim 12, further comprising:

when the call forwarding state is a call forwarding disable state, downloading a new eSIM profile from a server and installing the new eSIM profile in the external electronic device;

changing the installed eSIM profile to an enable state; and setting up the call forwarding using the changed eSIM profile.

15. The method of claim 11, further comprising performing at least one operation of downloading at least one eSIM profile in the external electronic device, changing a state of the call forwarding on the eSIM profile, and deleting the eSIM profile.

* * * * *